United States Patent [19]
Mallick et al.

[11] Patent Number: 5,961,639
[45] Date of Patent: Oct. 5, 1999

[54] PROCESSOR AND METHOD FOR DYNAMICALLY INSERTING AUXILIARY INSTRUCTIONS WITHIN AN INSTRUCTION STREAM DURING EXECUTION

[75] Inventors: Soummya Mallick; Robert G. McDonald; Edward L. Swarthout, all of Austin, Tex.

[73] Assignee: International Business Machines Corporation, Armonk, N.Y.

[21] Appl. No.: 08/767,492

[22] Filed: Dec. 16, 1996

[51] Int. Cl.$^6$ ........................................................ G06F 9/38
[52] U.S. Cl. ............................................ 712/242; 712/209
[58] Field of Search ..................................... 395/589, 590, 395/385, 183.11, 182.06

[56] References Cited

U.S. PATENT DOCUMENTS

| | | | |
|---|---|---|---|
| 3,366,929 | 1/1968 | Mullery et al. ............................... | 395/589 |
| 3,571,804 | 3/1971 | Hemdal ....................................... | 395/589 |
| 3,660,825 | 5/1972 | De Sandre .................................. | 395/589 |
| 3,794,980 | 2/1974 | Cogar et al. ................................ | 395/589 |
| 4,414,624 | 11/1983 | Summer, Jr. et al. . | |
| 4,607,332 | 8/1986 | Goldberg ................................... | 395/182.06 |
| 4,608,631 | 8/1986 | Stiffler et al. . | |
| 4,769,767 | 9/1988 | Hilbrink .................................... | 395/182.06 |
| 4,831,517 | 5/1989 | Crouse et al. ............................ | 395/182.06 |
| 4,837,678 | 6/1989 | Culler et al. . | |
| 5,021,945 | 6/1991 | Morrison et al. . | |
| 5,133,077 | 7/1992 | Karne et al. . | |
| 5,168,547 | 12/1992 | Miller et al. . | |
| 5,197,130 | 3/1993 | Chen et al. . | |
| 5,212,778 | 5/1993 | Dally et al. . | |
| 5,276,819 | 1/1994 | Rau et al. . | |
| 5,313,647 | 5/1994 | Kaufman et al. . | |
| 5,416,913 | 5/1995 | Grochowski et al. . | |
| 5,430,850 | 7/1995 | Papadopoulos et al. . | |
| 5,442,797 | 8/1995 | Casavant et al. . | |
| 5,452,456 | 9/1995 | Gaetner et al. . | |
| 5,469,549 | 11/1995 | Simpson et al. . | |
| 5,488,730 | 1/1996 | Brown, III et al. . | |
| 5,535,361 | 7/1996 | Hirata et al. ............................... | 711/145 |
| 5,581,776 | 12/1996 | Hagqvist et al. ........................... | 395/590 |

OTHER PUBLICATIONS

Northcutt et al.,"The Alpha Operating System: Kernel Internals", Archons Project Technical Report, pp. 23–24, May 1988.
Caradonna et al., "New Synchronization Services for OSF Match: Synchronizers", pp. 1–19, Aug. 1994.
Dasgupta et al., "Distributed Programming with Objects and Threads in the Clouds System", pp. 1–9 date unknown.
Tokuda et al., "Real–Time Mach: Towards a Predictable Real–Time System",pp. 1–10 date unknown.
Digital Equipment Corporation, "Open VMS RTL Parallel Processing (PPL$) Manual," May 1993, pp. 4–1/4–17.
Tevanian et al., "Mach Threads and the Unix Kernel: The Battle for Control," pp. 1–12 date unknown.

*Primary Examiner*—Richard L. Ellis
*Attorney, Agent, or Firm*—Casimer K. Salys; Brian F. Russell; Andrew J. Dillon

[57] ABSTRACT

A processor and method of executing a program within a processor are provided. According to the method, a plurality of program instructions comprising a program and a set of auxiliary instructions are stored. An instruction stream including selected ones of the plurality of program instructions is supplied to the processor. In response to the processor processing a program instruction within the instruction stream that has an associated auxiliary instruction within the set of auxiliary instructions, the associated auxiliary instruction is automatically inserted within the instruction stream and the associated auxiliary instruction is executed within the processor.

16 Claims, 18 Drawing Sheets

PROCESSOR AND METHOD FOR DYNAMICALLY INSERTING AUXILIARY INSTRUCTIONS WITHIN AN INSTRUCTION STREAM DURING EXECUTION

CROSS-REFERENCE TO RELATED APPLICATIONS

This application is related to the following patent applications, which are incorporated herein by reference:

(1) application Ser. No. 08/767,488, entitled "METHOD AND SYSTEM FOR CONSTRUCTING A MULTISCALAR PROGRAM INCLUDING A PLURALITY OF THREAD DESCRIPTORS THAT EACH REFERENCE A NEXT THREAD DESCRIPTOR TO BE PROCESSED," filed of even date herewith;

(2) application Ser. No. 08/767,487, entitled "METHOD AND SYSTEM FOR EXECUTING A PROGRAM WITHIN A MULTISCALAR PROCESSOR BY PROCESSING LINKED THREAD DESCRIPTORS," filed of even date herewith;

(3) application Ser. No. 08/767,489, entitled "METHOD AND SYSTEM FOR CONCURRENTLY EXECUTING MULTIPLE THREADS CONTAINING DATA DEPENDENT INSTRUCTIONS, " filed of even date herewith;

(4) application Ser. No. 08/767,491, entitled "METHOD AND SYSTEM FOR CONSTRUCTING A PROGRAM INCLUDING A NAVIGATION INSTRUCTION," filed of even date herewith; and (5) application Ser. No. 08/767,490, entitled "METHOD AND SYSTEM FOR CONSTRUCTING A PROGRAM INCLUDING OUT-OF-ORDER THREADS AND PROCESSOR AND METHOD FOR EXECUTING THREADS OUT-OF-ORDER," filed of even date herewith.

BACKGROUND

1. Technical Field

The technical field of the present specification relates in general to a method and system for data processing and in particular to a method and system for multiscalar data processing.

2. Description of the Related Art

In the development of data processing systems, it became apparent that the performance capabilities of a data processing system could be greatly enhanced by permitting multiple instructions to be executed simultaneously. From this realization, several processor paradigms were developed that each permit multiple instructions to be executed concurrently.

A superscalar processor paradigm is one in which a single processor is provided with multiple execution units that are capable of concurrently processing multiple instructions. Thus, a superscalar processor may include an instruction cache for storing instructions, at least one fixed-point unit (FXU) for executing fixed-point instructions, a floating-point unit (FPU) for executing floating-point instructions, a load/store unit (LSU) for executing load and store instructions, a branch processing unit (BPU) for executing branch instructions, and a sequencer that fetches instructions from the instruction cache, examines each instruction individually, and opportunistically dispatches each instruction, possibly out of program order, to the appropriate execution unit for processing. In addition, a superscalar processor typically includes a limited set of architected registers that temporarily store operands and results of processing operations performed by the execution units. Under the control of the sequencer, the architected registers are renamed in order to alleviate data dependencies between instructions.

State-of-the-art superscalar processors afford a performance of between 1 and 2 instructions per cycle (IPC) by, among other things, permitting speculative execution of instructions based upon the dynamic prediction of conditional branch instructions. Because superscalar processors have no advance knowledge of the control flow graph (CFG) (i.e., the control relationships linking basic blocks) of a program prior to execution, IPC performance is necessarily limited by branch prediction accuracy. Thus, increasing the performance of the superscalar paradigm requires not only improving the accuracy of the already highly accurate branch prediction mechanism, but also supporting a broader instruction issue bandwidth, which requires exponentially complex sequencer circuitry to analyze instructions and resolve instruction dependencies and antidependencies. Because of the inherent difficulty in overcoming the performance bottlenecks of the superscalar paradigm, the development of increasingly aggressive and complex superscalar processors has a diminishing rate of return in terms of IPC performance.

An alternative processing paradigm is that provided by parallel and multiprocessing data processing systems, which although having some distinctions between them, share several essential characteristics. Parallel and multiprocessor data processing systems, which each typically comprise multiple identical processors and are therefore collectively referred to hereinafter as multiple processor systems, execute programs out of a shared memory accessible to the processors across a system bus. The shared memory also serves as a global store for processing results and operands, which are managed by a complex synchronization mechanism to ensure that data dependencies and antidependencies between instructions executing on different processors are resolved correctly. Like superscalar processors, multiple processor systems are also subject to a number of performance bottlenecks.

A significant performance bottleneck in multiple processor systems is the latency incurred by the processors in storing results to and retrieving operands from the shared memory across the system bus. Accordingly, in order minimize latency and thereby obtain efficient operation, compilers for multiple processor systems are required to divide programs into groups of instructions (tasks) between which control and data dependencies are identified and minimized. The tasks are then each assigned to one of the multiple processors for execution. However, this approach to task allocation is not suitable for exploiting the instruction level parallelism (ILP) inherent in many algorithms. A second source of performance degradation in multiple processor systems is the requirement that control dependencies between tasks be resolved prior to the dispatch of subsequent tasks for execution. The failure of multiple processor systems to provide support for speculative task execution can cause processors within the multiple processor systems to incur idle cycles while waiting for inter-task control dependencies to be resolved. Moreover, the development of software for multiple processor systems is complicated by the need to explicitly encode fork information within programs, meaning that multiple processor code cannot be easily ported to systems having diverse architectures.

Recently, a new aggressive "multiscalar" paradigm, comprising both hardware and software elements, was proposed to address and overcome the drawbacks of the conventional superscalar and multiple processor paradigms described above. In general, the proposed hardware includes a collection of processing units that are each coupled to a sequencer, an interconnect for interprocessor communication, and a single set of registers. According to the proposed multiscalar paradigm, a compiler is provided that analyzes a program in terms of its CFG and partitions a program into multiple tasks, which comprise contiguous regions of the dynamic instruction sequence. In contrast to conventional multiple processor tasks, the tasks created by the multiscalar compiler may or may not exhibit a high degree of control and data independence. Importantly, the compiler encodes the details of the CFG in a task descriptor within the instruction set architecture (ISA) code space in order to permit the sequencer to traverse the CFG of the program and speculatively assign tasks to the processing units for execution without examining the contents of the tasks.

According to the proposed multiscalar paradigm, register dependencies are resolved statically by the compiler, which analyzes each task within a program to determine which register values each task might possibly create during execution. The compiler then specifies the register values that might be created by each task within an associated register reservation mask within the task descriptor. The register reservations seen by a given task are the union of the register reservation masks associated with concurrently executing tasks that precede the given task in program order. During execution of the program, a processing unit executing an instruction dependent upon a register value that might be created by a concurrently executing task stalls until the register value is forwarded or the reservation is released by the preceding task. Upon release of the register or receipt of a forwarded register value by the stalled processing unit, the reservation for the register is cleared within the register reservation mask of the stalled processing unit and the stalled processing unit resumes execution. In order to trigger the forwarding of register values, the compiler adds tag bits to each instruction within a task. The tag bits associated with the last instruction in a task to create a particular register value indicate that the register value is to be forwarded to all concurrently executing tasks subsequent to the task in program order. Release of a register, on the other hand, is indicated by a special release instruction added to the base ISA or created by overloading an existing instruction within the ISA.

In contrast to register dependencies, the proposed multiscalar paradigm does not attempt to statically resolve memory dependencies and permits load and store instructions to be executed speculatively. A dynamic check must then be made to ensure that no preceding task stores to a memory location previously loaded by a subsequent task. If such a dependency violation is detected, the execution of the task containing the speculative load and all subsequent tasks are aborted and appropriate recovery operations are performed. Further details of the proposed mlultiscalar architecture may be found in G. S. Sohi, S. E. Breach, and T. N. Vijaykumar, "Multiscalar Processors," *Proc. ISCA '95 Int'l Symposium on Computer Architecture,* June 1995, pp. 414–425.

The proposed multiscalar paradigm overcomes many of the deficiencies of other paradigms in that the multiscalar paradigm affords a wide instruction window from which instructions can be dispatched utilizing relatively simple scheduling hardware, is less sensitive to inter-task data dependencies and mispredicted branches, and is capable of exploiting the ILP believed to be present in most sequential programs. However, the proposed multiscalar architecture also has several deficiencies. First, backward compatibility of code binaries is sacrificed due to the insertion of release and other multiscalar instructions into the program to handle task synchronization. Second, multiscalar simulations have shown that the insertion of a large amount of multiscalar instructions that do no useful work into a program can actually degrade multiscalar performance to such an extent that better performance may be obtained with a conventional superscalar processor. Third, the attachment of additional bits to each instruction in the program, which was proposed in order to trigger the forwarding of processing results from a predecessor task to subsequent tasks, necessitates an increased instruction path width and additional hardware complexity. Fourth, the proposed multiscalar paradigm has no mechanism for handling dependencies between loads and stores to memory. Fifth, in the proposed multiscalar architecture, all tasks except the oldest are executed speculatively, meaning that even if task prediction accuracy is 90%, the prediction accuracy for tasks beyond the fifth task drops below 60%.

As should thus be apparent, it would be desirable to provide an enhanced multiscalar architecture that overcomes the foregoing and other deficiencies of the proposed multiscalar processor paradigm.

It is therefore one object of the present disclosure to provide an improved method and system for data processing.

It is another object of the present disclosure to provide an improved method and system for multiscalar data processing.

The foregoing objects are achieved as is now described. A processor and method of executing a program within a processor are provided. According to the method, a plurality of program instructions comprising a program and a set of auxiliary instructions are stored. An instruction stream including selected ones of the plurality of program instructions is supplied to the processor. In response to the processor processing a program instruction within the instruction stream that has an associated auxiliary instruction within the set of auxiliary instructions, the associated auxiliary instruction is automatically inserted within the instruction stream and the associated auxiliary instruction is executed within the processor.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The multiscalar processing paradigm disclosed herein overcomes numerous deficiencies of the previously proposed multiscalar paradigm through improvements to both the multiscaiar hardware and software architectures. In order to facilitate an understanding of the operation of the multiscalar processor hardware, an introduction to the improved muitiscalar software architecture will first be given.

Software Architecture

Figure 1A:
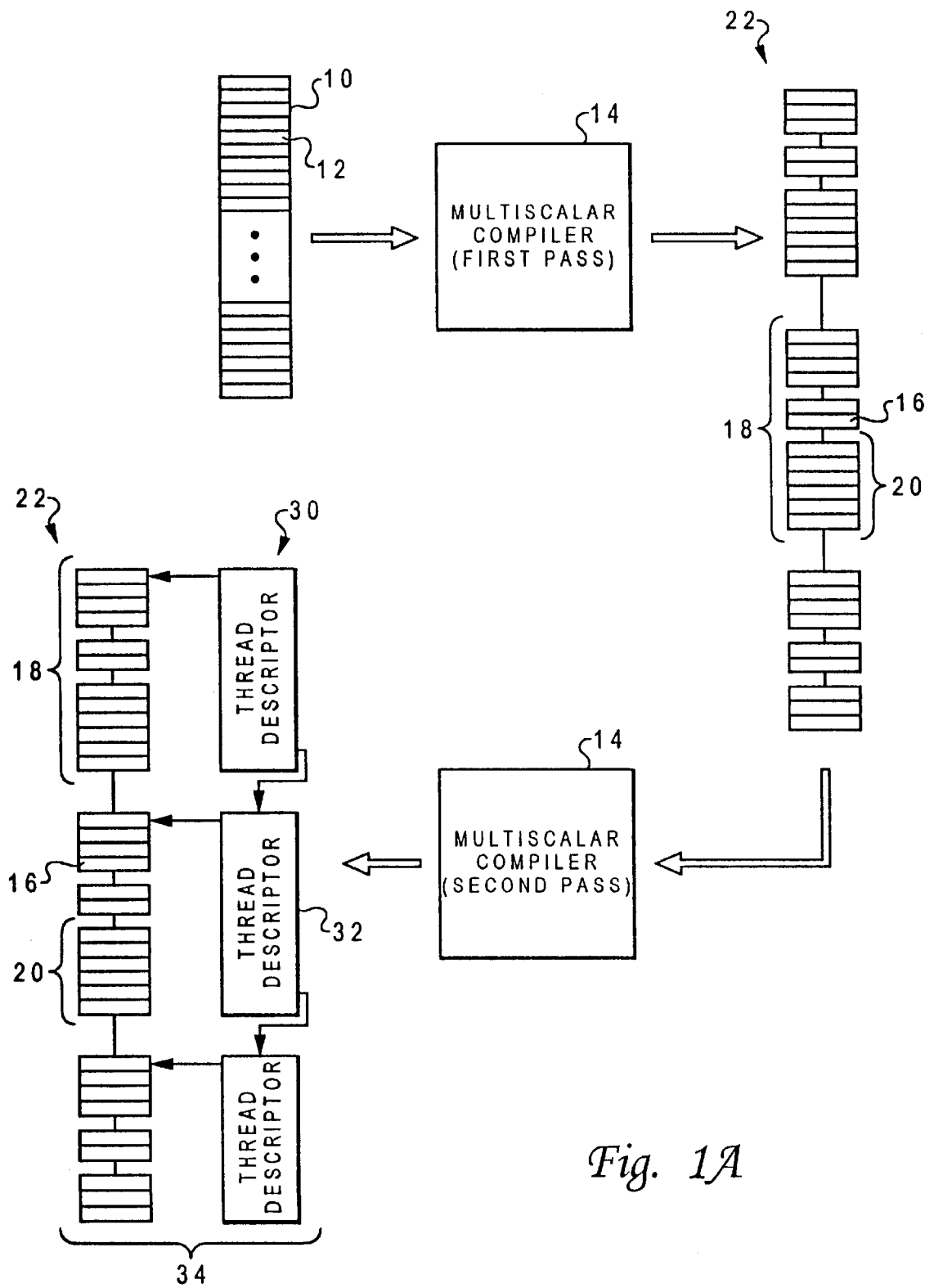
FIG. 1A illustrates a conceptual diagram of a process for constructing a multiscalar program, wherein the multiscalar program includes separate Instruction Code (I-Code) and Thread Code (T-Code) streams.

With reference now to the figures and in particular with reference to FIG. 1A, there is a conceptual diagram of a process for constructing a multiscalar program is illustrated. As depicted, an ordinary high level language (e.g., C++) program 10 containing a number of high level instructions 12 is input into multiscalar compiler 14 for processing. During a first pass, multiscalar compiler 14 translates each of high level instructions 12 into one or more executable instruction set architecture (ISA) instructions 16 arranged in a particular program order. In addition, multiscalar compiler 14 partitions ISA instructions 16 into one or more threads 18, which each contain a logically contiguous group of ISA instructions 16. As utilized hereinafter, the term thread refers to a set of one or more logically contiguous instructions within a multiscalar program that have a single entry point and multiple possible exit points. In other words, when a thread is executed, the first instruction within the thread is always executed, but there are multiple possible execution paths out of the thread. Importantly, the multiscalar software architecture disclosed herein permits each ISA instruction 16 to be included within more than one thread 18 and does not utilize the explicit programmed forks required by conventional multiple processor software architectures. Threads 18 can be distinguished from basic blocks 20 in that basic blocks 20 are sets of sequential ISA instructions terminated by a branch instruction. Basic blocks 20 have only two exit points, but may have two or more entry points. The set of threads 18 produced by the first pass of multiscalar compiler 14 forms Instruction Code (I-Code) stream 22.

Because threads 18 are not necessarily substantially data and control independent (in contrast to those processed in parallel and multiprocessor systems), information describing the CFG of program 10 and inter-thread data dependencies must be made available to a multiscalar processor during execution in order to permit concurrent execution of multiple threads. Accordingly, during a second pass multiscalar compiler 14 generates a Thread Code (T-Code) stream 30 including a number of thread descriptors 32 that are each associated with a respective one of threads 18. Each thread descriptor 32 provides the information needed to support multiscalar thread scheduling, thread prediction, and thread synchronization, including (as depicted in FIG. 1) pointers to both the corresponding thread 18 and subsequent thread descriptors 32. I-Code stream 22 and T-Code stream 30 together comprise a multiscalar program 34 executable by the multiscalar data processing system described below with reference to FIG. 4.

Figure 2:
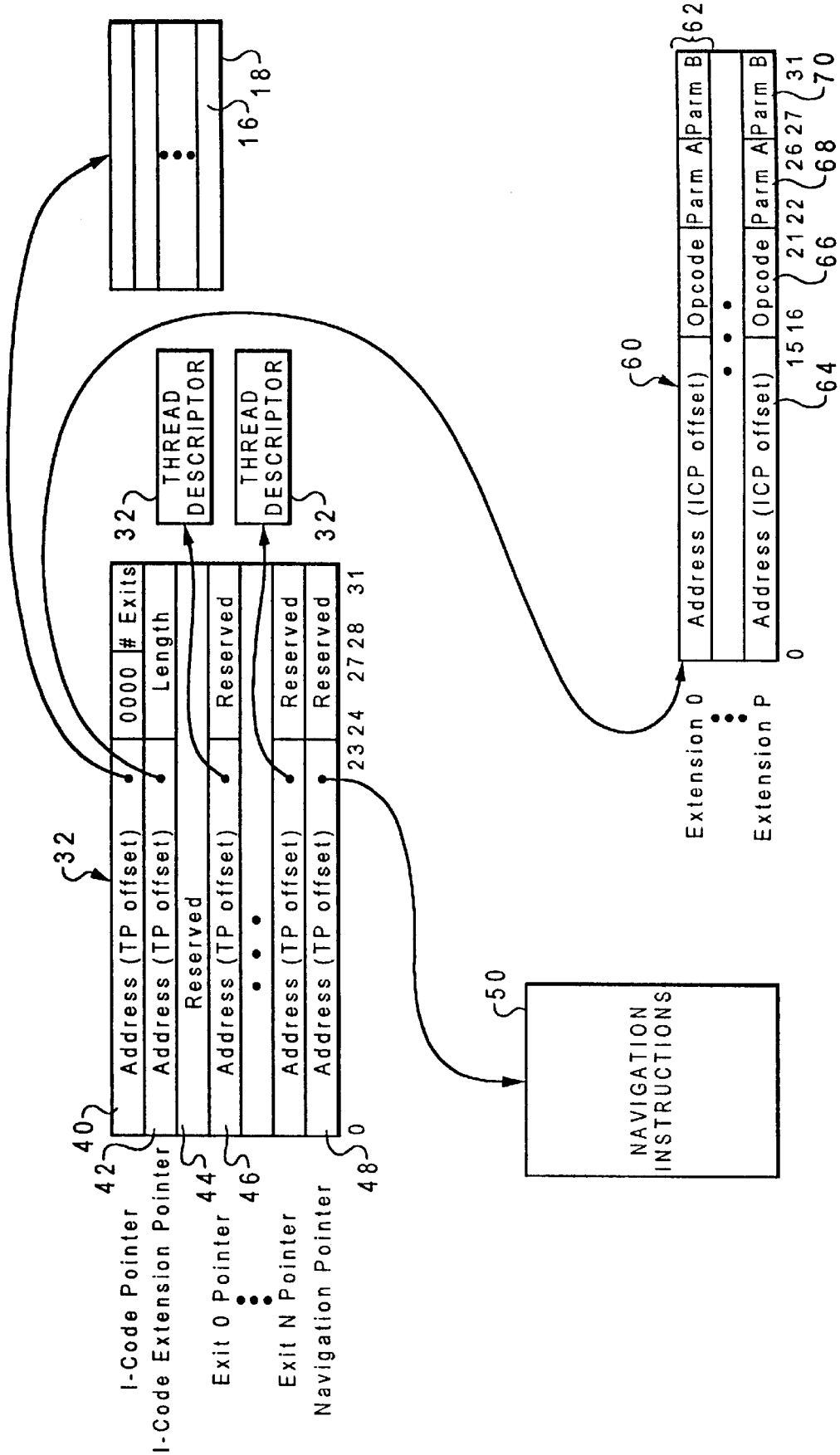
FIG. 2 depicts an illustrative embodiment of a thread descriptor within the T-Code stream depicted in FIG. 1.

With reference now to FIG. 2, there is depicted a more detailed diagram of an illustrative embodiment of a thread descriptor 32 associated with a thread 18. As illustrated, thread descriptor 32 is a data structure containing a number of 32-bit entries. The first 32-bit entry contains a 24-bit I-Code pointer 40 that indicates the address of the first ISA instruction 16 within thread 18 relative to the address indicated by a hardware-maintained thread pointer (TP). As described above, the ISA instruction 16 pointed to by I-Code pointer 40 will be the first instruction executed within thread 18. The first 32-bit entry also includes 4 bits that indicate the number of possible exit points within the associated thread 18.

As illustrated, thread descriptor 32 also includes at least two 32-bit entries that each contain a 24-bit exit pointer 46. Each exit pointer 46 is associated with a possible exit point of thread 18 and indicates a TP-relative address of a thread descriptor 32 associated with the next thread 18 to be executed if the associated exit point of the current thread 18 is taken or predicted as taken. The 32-bit entries containing exit pointers 46 also include an 8-bit reserved section that may be subsequently defined to provide further exit information. Future improvements to the multiscalar architecture disclosed herein may also be supported by defining the reserved 32-bit entries indicated at reference numeral 44.

Thread descriptor 32 further contains a 24-bit I-Code Extension pointer 42 that points to an extension list 60 containing auxiliary extension instructions that are to be dynamically inserted into thread 18 by the multiscalar processor hardware during execution. The length of (i.e., number of entries within) extension list 60 is specified by the final 8 bits of the 32-bit entry. Referring now to extension list 60, each of extension list entries 62 contains a 16-bit address identifier 64 that indicates, relative to I-Code pointer 40, the address of an ISA instruction 16 within thread 18. The indicated instruction address specifies the location within thread 18 at which the extension instruction defined by 6-bit opcode 66 is to be dynamically inserted. Finally, each extension list entry 62 can optionally include parameters 68 and 70. Depending upon the type of extension instruction defined by opcode 66, parameters 68 and 70 can be utilized to indicate whether the extension instruction is to be executed prior to, subsequent to, or in conjunction with the ISA instruction 16 indicated by address identifier 64. As will be appreciated by those skilled in the art, multiple extension instructions may be associated with a single ISA instruction address.

Following is a description of a number of instruction extensions that can be inserted into extension lists 60 by multiscalar compiler 14 in order to support thread scheduling, thread prediction, and thread synchronization:

SetExit: Marks a possible exit point of a thread;

SetStop: Marks a possible exit point at which multiscalar execution terminates if the possible exit point is taken;

SetFlag: Sets a specified hardware-maintained synchronization flag (SF) to indicate that register or memory data is available for use by subsequent threads;

WaitFlag: Delays execution of one or more specified instructions within a thread until a specified SF is set; and ChainFlag: Sets a second SF in response to a first SF being set.

In order to minimize penalties attributable to inter-thread data hazards, multiscalar compiler 14 utilizes SetFlag and Waitflag extension instructions to resolve every inter-thread register data dependency (although hardware support is also available as discussed below with reference to FIG. 4). Accordingly, multiscalar compiler 14 preferably creates a SetFlag extension instruction in the extension list 60 of the thread that produces a data value and creates a WaitFlag extension instruction in the extension list 60 of the thread that consumes the data value. In addition, if the execution path between two threads is not control-independent, multiscalar compiler 14 creates SetFlag extension instructions within the alternative execution path(s) in order to ensure that the consuming thread can proceed as soon as the data dependency (or possible data dependency) is resolved.

Figure 3:
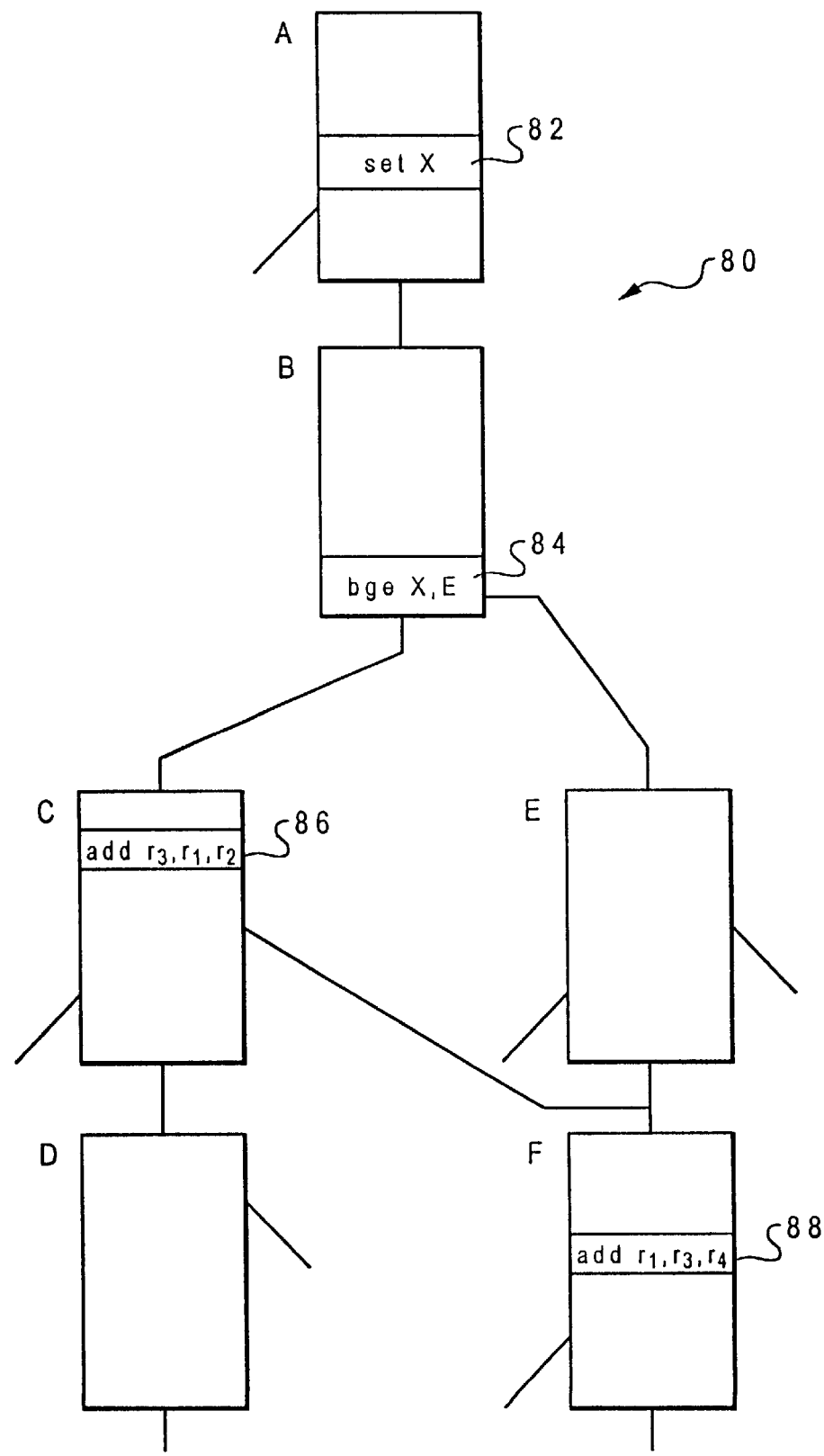
FIG. 3 illustrates an exemplary multiscalar program fragment that includes possibly dependent instruction set architecture (ISA) instructions synchronized by SetFlag and WaitFlag extension instructions, wherein the program fragment further includes an inter-thread control dependency that may be resolved by executing a set of T-Code navigation instructions created by the multiscalar compiler.

For example, referring to FIG. 3, there is illustrated a fragment of a multiscalar program for which multiscalar compiler 14 will create SetFlag and WaitFlag extension instructions. As depicted, thread C contains ISA instruction 86, which specifies that the sum of registers GPR1 and GPR2 is to be calculated and stored within GPR3. Thread F contains ISA instruction 88, which specifies that the sum of GPR3 and GPR4 is to be calculated and stored within GPR1. Thus, in the present example, thread C is a producer of the value of GPR3 and thread F is a consumer of the value of GPR3. During compilation of multiscalar program 80, multiscalar compiler 14 inserts a WaitFlag extension instruction in extension list 60 of thread F that is associated with the instruction address of ISA instruction 88. The WaitFlag extension instruction specifies that it is to be inserted into thread F prior to ISA instruction 88 so that execution of ISA instruction 88 (and possibly other instructions within thread F) is stalled until a specified SF is set. In addition, multiscalar compiler 14 inserts a SetFlag extension instruction in extension list 60 of thread C that is associated with the instruction address of ISA instruction 86. The SetFlag extension instruction specifies that it is to be inserted into thread C following ISA instruction 86. Furthermore, multiscalar compiler 14 inserts a SetFlag extension instruction into extension list 60 of thread E so that, if control passes from thread B to thread E to thread F during execution, the execution of thread F is not unnecessarily stalled by the WaitFlag extension instruction.

In contrast to possible register data dependencies, which are always detected and synchronized utilizing SetFlag and WaitFlag extension instructions, multiscalar compiler 14 only utilizes the SetFlag and WaitFlag extension instructions to synchronize disambiguable memory data accesses (i.e., memory data accesses known to be dependent because the target addresses can be statically determined). Other memory data accesses are assumed to be independent by multiscalar compiler 14 and are monitored by the multiscalar processor hardware described below in order to prevent data inconsistencies.

Referring again to FIG. 2, thread descriptor 32 may optionally include an entry containing a 24-bit navigation pointer 48 that points to a set of navigation instructions 50. In accordance with the illustrative embodiment of a multiscalar data processing system described below with reference to FIG. 4, navigation instructions 50 may be utilized by the multiscalar processor's thread scheduling hardware to traverse the CFG of I-Code stream 22 in a non-speculative fashion.

With reference again to FIG. 3, multiscalar program 80 also illustrates a scenario in which multiscalar compiler 14 may create a set of navigation instructions 50 in order to facilitate non-speculative thread scheduling. As depicted, thread A of multiscalar program 80 contains ISA instruction 82, which sets a variable X to a particular value. Thread B contains ISA instruction 84, which causes control to pass to thread E if X has a value greater than or equal to 0 and to pass to thread C if X has a value less than 0. If multiscalar program 80 were executed in the previously proposed multiscalar processor, the sequencer hardware would simply predict one of the exits of thread B and speculatively assign the indicated one of threads C and E to a processing element prior to the execution of ISA instruction 84. In contrast, according to the multiscalar paradigm disclosed herein, multiscalar compiler 14 identifies ISA instruction 82 as a condition setting instruction and ISA instruction 84 as an inter-thread control flow instruction that depends upon the condition set by ISA instruction 82. Multiscalar compiler 14 then inserts a navigation pointer 48 into thread B's thread descriptor 32 that points to a set of navigation instructions 50 also created by multiscalar compiler 14. The set of navigation instructions 50 created by multiscalar compiler 14 for thread B may be expressed as follows:

```
if x < 0
        fork C
else
        fork E
endif;
```

By making these navigation instructions available to the thread scheduler hardware at runtime through navigation pointer 48, the thread scheduler can schedule one of threads C and E to a processing element for non-speculative execution. Thus, in this instance, the penalty for exit misprediction is totally eliminated. Multiscalar compiler 14 can also provide such control flow information for other types of inter-thread control flow instructions, including if-then-else and loop constructs. Importantly, the navigation instructions 50 generated by multiscalar compiler 14 can alternatively be accessed by an extension pointer 64 within extension list 60. Furthermore, navigation instructions 50 can be executed within a processing element of the multiscalar processor on behalf of the thread scheduler.

Figure 1B:
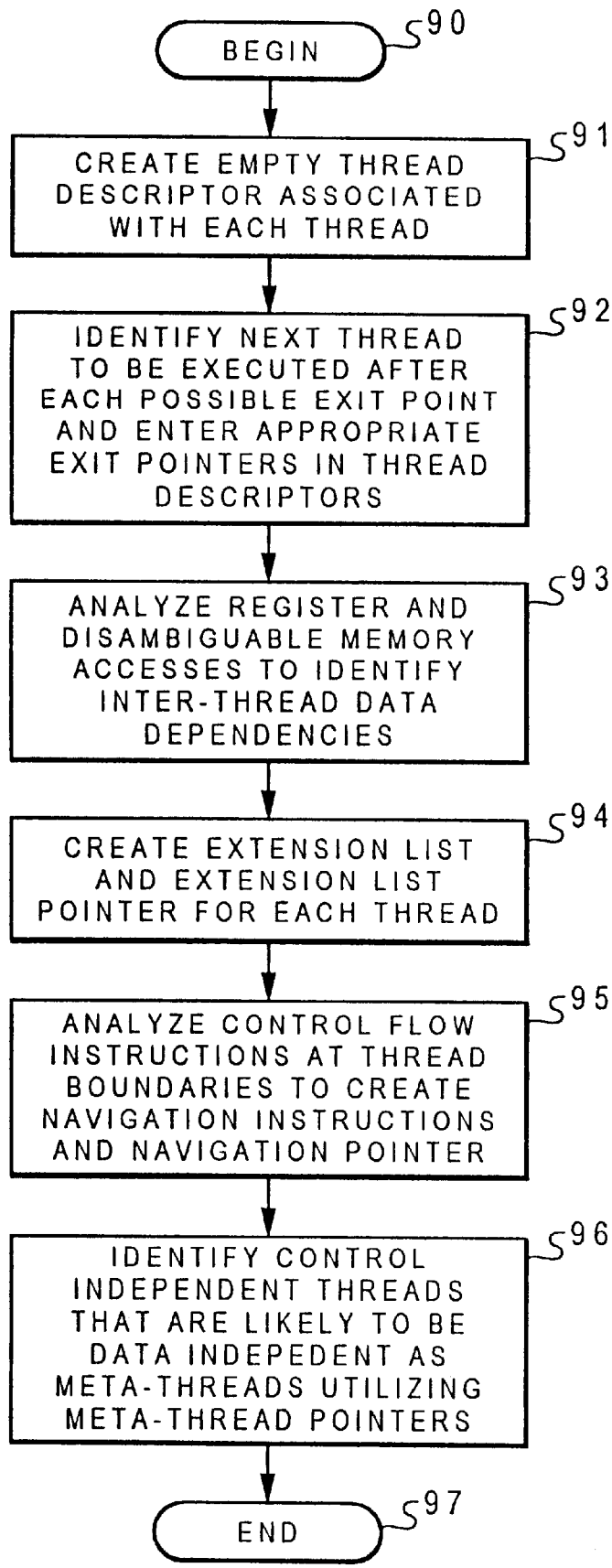
FIG. 1B depicts a high level logical flowchart of an illustrative embodiment of the process by which a multiscalar compiler builds the T-Code stream of the multiscalar program.

With reference now to FIG. 1B, there is depicted a high level logical flowchart that summarizes the method by which multiscalar compiler 14 constructs T-Code stream 30 in an illustrative embodiment. As illustrated, the process begins at block 90 in response to multiscalar compiler 14 translating high level instructions 12 into ISA instructions 16 and partitioning ISA instructions 16 into one or more threads 18, which as described above each include a single entry point and a plurality of possible exit points. The process then proceeds to block 91, which depicts multiscalar compiler 14 creating an empty thread descriptor 32 associated with each thread 18. The process proceeds from block 91 to block 92, which depicts multiscalar compiler 14 identifying the next thread to be executed in program order following each possible exit point of threads 18. Multiscalar compiler 14 utilizes the exit information to insert appropriate exit pointers and exit counts within thread descriptors 32. Next, the process passes to block 93, which illustrates multiscalar compiler 14 identifying inter-thread data dependencies by analyzing the register IDs and memory addresses accessed by ISA instructions 16. As depicted at block 94, multiscalar compiler 14 utilizes the exit information ascertained at block 92 and the data dependency information collected at block 93 to create an extension list 60 associated with each respective thread 18. As described above, extension lists 60 contain the extension instructions utilized by the multiscalar processor hardware to resolve identified inter-thread data dependencies and to identify possible exit points of threads. Multiscalar compiler also creates an I-Code extension pointer 42 within each thread descriptor 32 that references the associated extension list 60. The process then proceeds from block 94 to block 95, which illustrates multiscalar compiler 14 analyzing the control flow instruction(s) adjacent to each thread boundary to determine if the conditions upon which the control flow instructions depend can be resolved prior to prediction of an exit point of the threads. As described above with reference to FIG. 3, in response to detection of a control flow condition that can be resolved prior to exit prediction, multiscalar compiler 14 creates a set of navigation instructions 50 executable by or on behalf of the thread scheduler and inserts a navigation pointer 48 within the thread descriptor 32. The process proceeds from block 95 to optional block 96, which is described below with reference to FIG. 14, and thereafter terminates at block 97.

Referring again to FIG. 2, in order to permit selective multiscalar execution of multiscalar program 34, I-Code stream 22 preferably includes at least one SetTP instruction near the beginning that triggers concurrent execution of threads 18 by initializing the value of the hardware TP. In order to maintain software compatibility with prior processor paradigms, the SetTP instruction preferably overloads a seldom used instruction within the ISA, such as an alternative form of a noop or branch instruction. I-Code stream 22 preferably also includes SetTP instructions at locations scattered throughout I-Code stream 22. The additional SetTp instructions permit concurrent execution of threads 18 to be resumed following an exception or other interruption of multiscalar execution and are ignored by hardware if threads 18 are being executed concurrently.

Having provided an overview of an illustrative embodiment of the improved multiscalar software architecture, the hardware architecture will now be described.

Hardware Architecture

Figure 4:
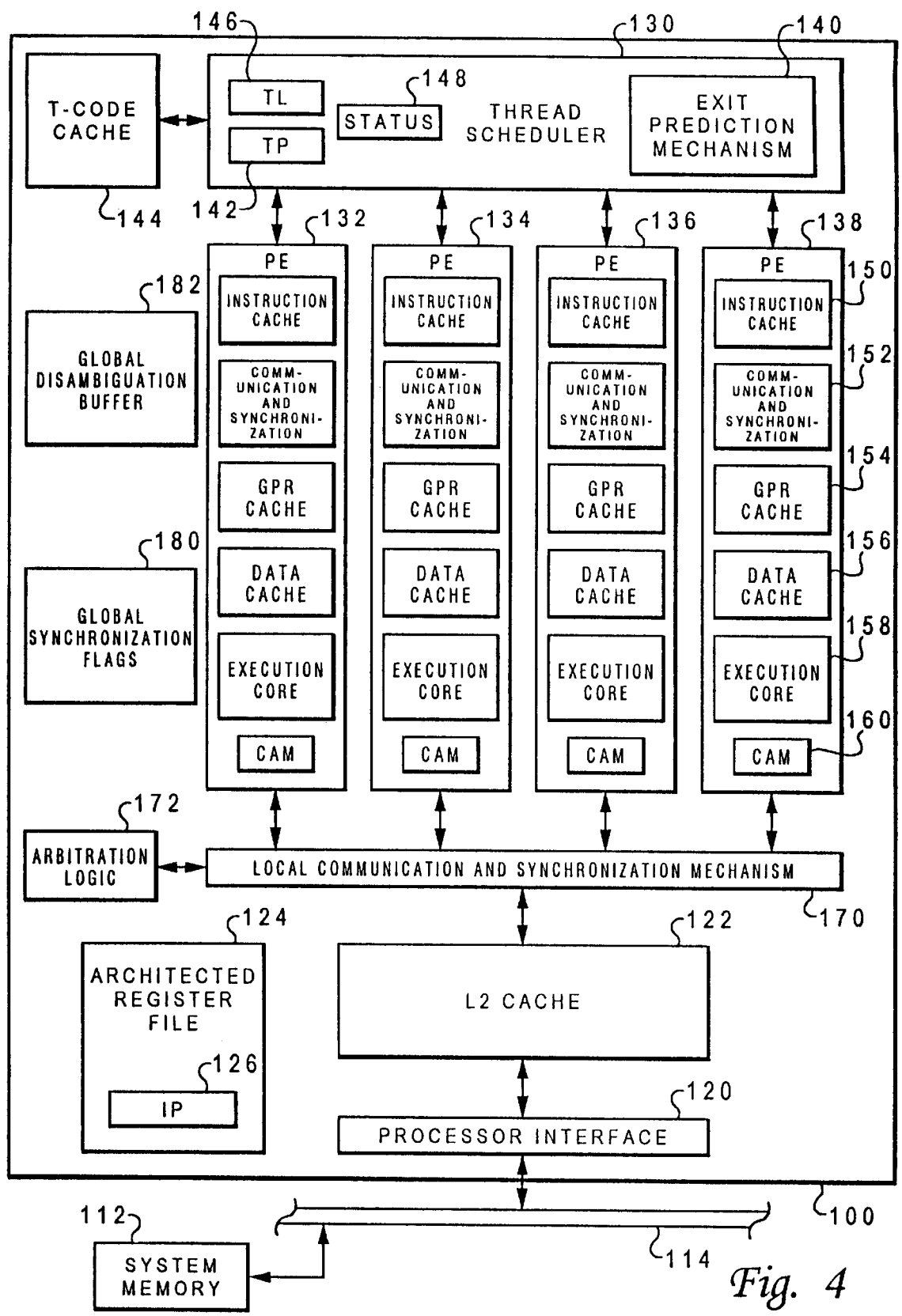
FIG. 4 is a block diagram depiction of an illustrative embodiment of a multiscalar data processing system.

Referring now to FIG. 4, there is depicted an illustrative embodiment of a multiscalar data processing system. As illustrated, the multiscalar data processing system includes a multiscalar processor 100, which is coupled to system memory 112 and other unillustrated components of the muitiscalar data processing system via system bus 114. As depicted, multiscalar processor 100 includes processor interface circuitry 120, which comprises the latches and support circuitry necessary to communicate data and instructions between system bus 114 and unified level two (L2) cache 122. As a unified cache, L2 cache 122 stores a copy of a subset of both the data and instructions residing in system memory 112 for use by multiscalar processor 100 during execution. Coherency between the data stored within L2 cache 122 and system memory 112 is maintained utilizing a conventional cache coherency protocol. Multiscalar processor 100 further includes architected register file 124, which in addition to providing register storage for data and condition information, includes instruction pointer (IP) 126, which indicates the instruction address at which multiscalar processor 100 is currently executing non-speculatively. As described in greater detail below, multiscaiar processor 100 is capable of executing multiple threads concurrently, only one of which is typically executing non-speculatively. Thus, IP 126 marks the current point of execution in this non-speculative thread. In contrast to information maintained within the execution circuitry of multiscaiar processor 100, information within architected register file 124, L2 cache 122, and processor interface circuitry 120 is in a committed state, meaning that this information constitutes a non-speculative, consistent machine state to which multiscalar processor 100 can return upon interruption.

Still referring to FIG. 4, the execution circuitry of multiscalar processor 100 includes thread scheduler 130 and a scalable number of identical processing elements (PEs), which in the illustrative embodiment include PEs 132, 134, 136, and 138. In accordance with the multiscalar software architecture described above, thread scheduler 130 processes thread descriptors within the T-Code stream of a multiscalar program in order to assign multiple threads to PEs 132–138 for concurrent execution. In order to reduce access latency, thread scheduler 130 is equipped with a T-Code cache 44 that stores the thread descriptors, thereby establishing separate fetch paths for the I-Code and T-Code streams. As noted above, ordinarily only one of PEs 132–138 executes non-speculatively at a time. The non-speculative thread, which is the earliest occurring thread in program order among the executing threads (and the thread that contains the instruction to which IP 126 points), is indicated by thread pointer (TP) 142 maintained by thread scheduler 130.

Thread scheduler 130 also includes exit prediction mechanism 140, which is utilized by thread scheduler 130 to predict exits of threads. In a first embodiment of multiscalar processor 100, exit prediction mechanism 140 comprises a static prediction mechanism that predicts one of the possible exits of a thread based upon information supplied by multiscalar compiler 14. For example, multiscalar compiler 14 could be constrained to list the statically predicted exit within the thread descriptor as Exit 0, thereby indicating to exit prediction mechanism 140 that this exit should be selected. Exit prediction mechanism 140 can alternatively be implemented as a history-based dynamic prediction mechanism like that utilized in a superscalar processor to predict branch resolutions.

As illustrated, thread scheduler 130 further includes a thread list (TL) 146 that records, in association with an arbitrary thread number, the exit number of each exit selected by thread scheduler 130. The thread number is utilized to identify the thread containing the selected exit in communication between thread scheduler 130 and PEs 132–138. In the illustrative embodiment, thread scheduler 130 tracks which of PEs 132–138 is (are) free utilizing a 4-bit status register 148 in which the state of each bit indicates whether a corresponding one of PEs 132–138 is free or busy. Status register 148 is updated each time a thread is scheduled to or completed by one of PEs 132–138.

Referring to PEs 132–138, the central component of each of PEs 132–138 is an execution core 158 that executes instructions contained within an assigned thread. In a preferred embodiment, execution core 158 contains superscalar circuitry that supports intra-thread branch speculation and includes multiple execution units capable of executing multiple OSA instructions out-of-order during each cycle. However, based upon design and cost considerations, execution core 158 of PEs 132–138 can alternatively employ any one of a number of diverse hardware architectures. For example, execution core 158 may comprise a single execution resource that executes ISA instructions sequentially. Regardless of which hardware architecture is utilized to implement execution core 158, each execution core 158 includes an instruction sequencer that fetches and dispatches instructions and at least one execution resource that executes instructions.

Local storage is provided to each execution core 158 by an associated instruction cache 150, data cache 156, and GPR cache 154, which respectively store the ISA instructions, memory data values, and data and condition register values required by the associated execution core 158 during execution. Each execution core 158 is also coupled to CAM 160 that stores the extension list associated with the thread executing within the associated execution core 158. Extension instructions in the extension list are dynamically inserted into the thread executed by the associated execution core 158 in accordance with the method described below with respect to FIG. 8.

Each of PEs 132–138 further includes communication and synchronization logic 152, which is coupled to both GPR cache 154 and data cache 156. Communication and synchronization logic 152 maintains register and memory data coherency (i.e., the availability of data to the associated PE) through inter-PE and PE-L2 communication across local communication and synchronization mechanism 170, which, in order to reduce latency, preferably includes four concurrent address busses for register communication and at least one address bus for memory communication. Communication across local communication and synchronization mechanism 170 is performed under the arbitrating control of arbitration logic 172. Further details of local communication and synchronization mechanism 170 may be found in J. L. Hennessy and D. A. Patterson, "Computer Architecture: A Quantitative Approach," second ed., Morgan Kaufmann Publishers, Inc., pp. 655–693, which is incorporated herein by reference. The inter-PE and PE-L2 communication conducted by communication and synchronization logic 152 is governed by the data coherency protocol depicted in FIGS. 12 and 13.

Figure 12:
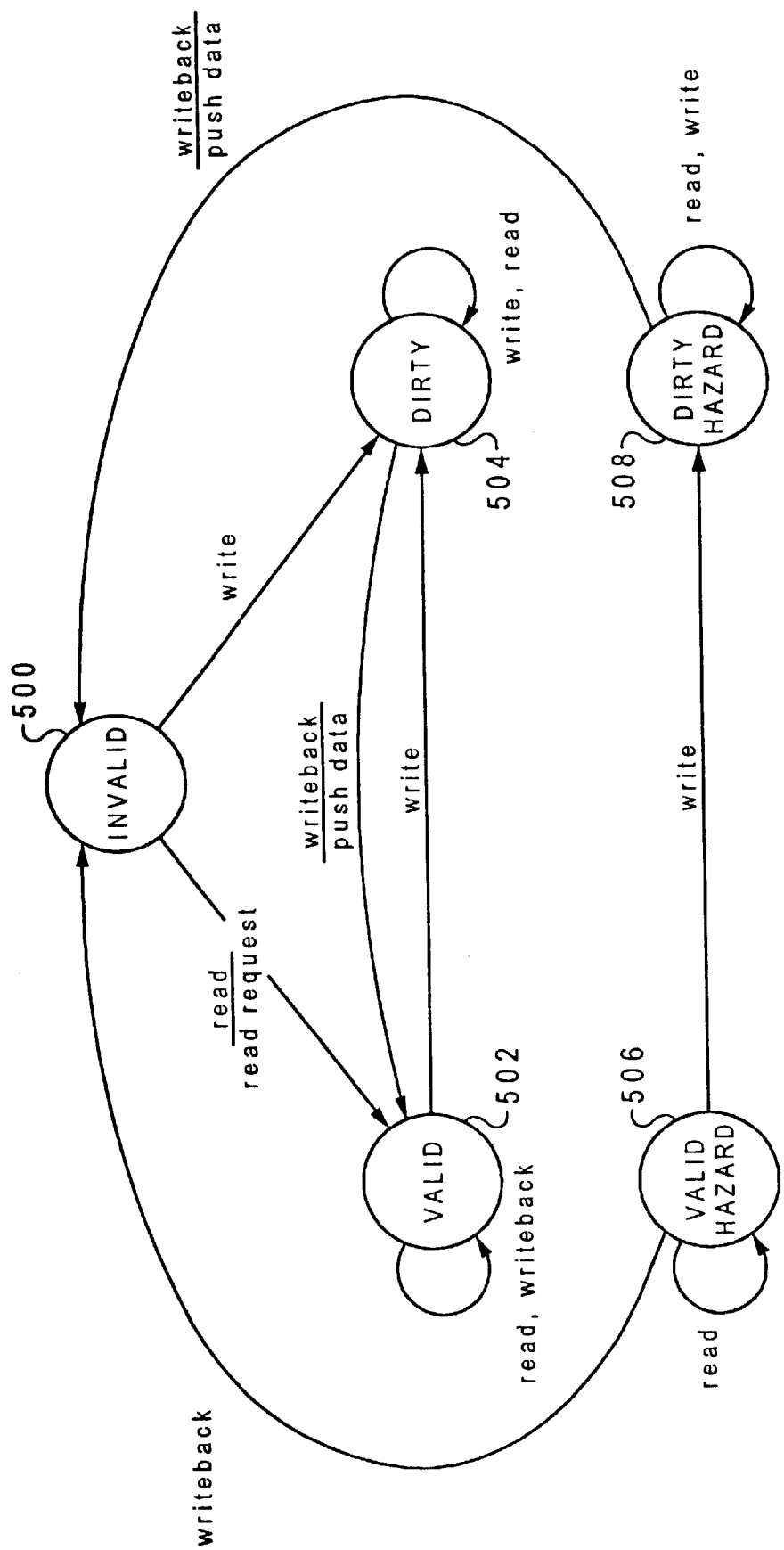
FIG. 12 depicts a state diagram of the protocol utilized by the processing elements (PEs) within the multiscalar processor illustrated in FIG. 4 to maintain local register and memory data coherency in response to local events.
Figure 13:
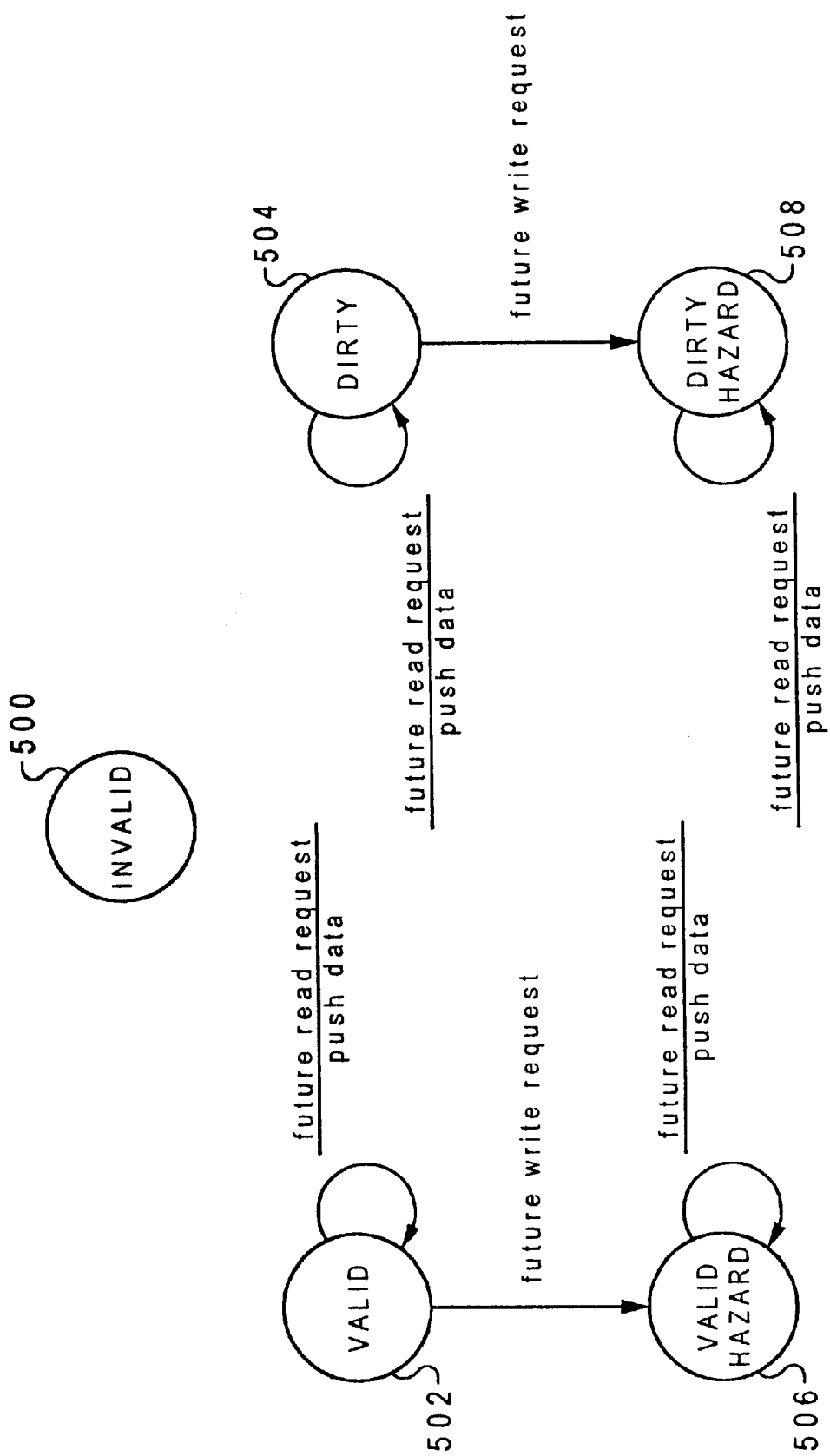
FIG. 13 illustrates a state diagram of the snooping protocol utilized by the PEs within the multiscalar processor depicted in FIG. 4 to maintain local register and memory data coherency in response to external events.

Referring now to FIGS. 12 and 13, two state diagrams are shown that together illustrate the data coherency protocol implemented by multiscalar processor 100 for both register and memory data. For clarity, FIG. 12 shows the portion of the data coherency protocol relating to local (intra-PE) events, while FIG. 13 shows the portion of the data coherency protocol relating to external (inter-PE) events received from local communication and synchronization mechanism 170. Because the data coherency protocol includes five states, the state of each data word in data cache 156 and each register within GPR cache 154 is preferably tracked utilizing three status bits. Those skilled in the art will appreciate from the following description that the data coherency protocol could alternatively be implemented within multiscalar processor 100 utilizing a directory-based coherency mechanism.

With reference first to FIG. 12, when execution of a multiscalar program begins, all data locations within GPR cache 154 and data cache 156 of each of PEs 132–138 are initially in invalid state 500. In response to receipt of an instruction within a thread, an execution core 158 within a PE requests data required for execution of the instruction from its local GPR cache 154 or data cache 156. If the data location associated with the requested data is in invalid state 500, meaning that the requested data is not present locally, communication and synchronization logic 152 broadcasts a read request indicating the register number or memory address of the required data on local communication and synchronization mechanism 170, which is snooped by each of PEs 132–138. As depicted in FIG. 13, the communication and synchronization logic 152 within PEs that have the requested register or memory data in any of valid state 502, dirty state 504, valid hazard state 506, or dirty hazard state 508 responds to the read request by indicating ownership of the requested data. PEs for which the requested data is in invalid state 500 do not respond. Based upon thread issue order information obtained from thread scheduler 130, arbitration logic 172 signals the responding PE executing the nearest preceding thread in program order to place the requested data on local communication and synchronization mechanism 170. However, if no PEs respond to the read request broadcast on local communication and synchronization mechanism 170, the communication and synchronization logic 152 within the requesting PE retrieves the required register or memory data from architected register file 124 or L2 cache 122, respectively. Referring again to FIG. 12, once the requested data is read into GPR cache 154 or data cache 156 of the requesting PE, communication and synchronization logic 152 updates the state of the data location from invalid state 500 to valid state 502. Data in valid state 502 is "owned" by the PE and hence can be utilized as an operand for subsequent instructions.

As depicted, communication and synchronization logic 152 updates a register or memory data location in invalid state 500 or valid state 502 to dirty (modified) state 504 in response to the local execution of a store or other instruction that writes data to the data location. A register or memory location in dirty state 504 does not change state in response to a local execution of an instruction that writes to the data location. Dirty state 504 is similar to valid state 506 in that data locations in dirty state 504 are also owned a PE and thus can be utilized as a source of operands for subsequent instructions. However, in contrast to data locations in valid state 502, data locations in dirty state 504 are written back to architected register file 124 and L2 cache 122 (i.e., the committed state) by communication and synchronization logic 152 in response to a receipt of a writeback signal during thread completion in order to update modified data locations. Importantly, following thread completion, data locations in valid state 502 do not undergo a state transition, leaving GPR cache 154 and data cache 156 "primed" with valid data that can be accessed by a subsequent thread executed locally or within another PE.

Referring again to FIG. 13, the data coherency protocol utilizes valid hazard state 506 and dirty hazard state 508 to mark data locations that have been written by PEs executing future threads in logical program order. Thus, communication and synchronization logic 152 updates a data location in valid state 502 to valid hazard state 506 and updates a data location in dirty state 504 to dirty hazard state 508 in response to receipt of a write request from a PE executing a future thread. The semantics of valid hazard state 506 and dirty hazard state 508 in response to both local and external events are the same as those of valid state 502 and dirty state 504, respectively, except in response to a writeback signal. Because valid hazard state 506 marks locally unmodified data locations that have been written by future threads (and therefore may not be valid after execution of the current thread), data locations in valid hazard state 506 are updated to invalid state 500 in response to receipt of a writeback signal by communication and synchronization logic 152. Similarly, data locations in dirty hazard state 508 are updated to invalid state 500 after the contents of the data locations are written back to architected register file 124 or L2 cache 122.

Still referring to FIG. 13, communication and synchronization logic 152 updates the state of all local data locations to invalid state 500 in response to the receipt of a reset signal generated in response to the occurrence of an exception or the detection of a data or control hazard. As discussed above, setting the state of all local data locations to invalid state 500 discards all of the data within GPR cache 154 and data cache 156.

With reference again to FIG. 4, multiscalar processor 100 further includes a global disambiguation buffer 182 coupled to PEs 132–138 that verifies inter-thread data consistency, that is, that the execution of a multiscalar program obtains the same results as those obtained under sequential, scalar execution.

In the illustrative embodiment of multiscalar processor 100, memory data inconsistencies can occur because execution cores 158 queue store instructions and preferentially perform load instructions such that memory data latency is minimized. This practice, which tacitly assumes that memory accesses are data independent, can lead to data inconsistency if memory accesses are, in fact, dependent between threads. In order to detect an inter-thread memory data inconsistency, global disambiguation buffer 182 stores the target addresses and thread numbers of load instructions and the target addresses and thread numbers of store instructions such that the relative execution order of the load and store instructions is retained. Global disambiguation buffer 182 then compares the target address of each store instruction executed by PEs 132–138 with the buffered load addresses. If a target address match is found and (1) the thread number of the load instruction follows the thread number of the store instruction in logical program order, and (2) there is no intervening store to the target address within the thread containing the load instruction, thereby indicating that the load instruction was dependent upon a store instruction, global disambiguation buffer 182 signals that a data inconsistency (hazard) has been detected by generating a cancellation signal. In response to a cancellation signal generated by global disambiguation buffer 182, all threads subsequent to the thread containing the load instruction are cancelled and the thread containing the load instruction is reexecuted utilizing the correct memory data.

The cancellation of threads in response to the detection of a data inconsistency can be handled in at least two ways, depending upon design considerations. In a first embodiment, the cancellation signal sets a consistency bit within thread scheduler 130 that is associated with the PE executing the thread that loaded the inconsistent data. As discussed below with reference to FIG. 10, the consistency bit is subsequently processed during the completion of the thread that loaded the inconsistent data. This approach has the advantage of requiring that the consistency bit be checked only a single time during thread processing. However, if data inconsistencies occur relatively frequently or early in the execution of a thread, this approach permits a large amount of useless work to be performed prior to thread cancellation. Alternatively, in a second embodiment, the cancellation signal generated by global disambiguation buffer 182 can set a bit within the PE executing the thread that loaded the inconsistent data. Although this embodiment requires each of PEs 132–138 to check its consistency bit during each cycle, thereby increasing latency, the second embodiment has the advantage of detecting and correcting for data inconsistencies as early as possible, so that the number of processor cycles consumed by useless work is minimized.

In order to correct for possible errors by multiscalar compiler 14 in identifying inter-thread register dependencies with SetFlag/WaitFlag extension instructions or in order to permit multiscalar compiler 14 to insert SetFlag/WaitFlag extension instruction in only the statistically most likely execution paths, global disambiguation buffer 182 preferably further include facilities that ensure inter-thread register data consistency. Similar to the facilities that handle memory data accesses, the register data facilities store the register number and thread number of instructions that read and write register data in a manner that preserves the relative execution order of the "read" and "write" instructions. Global disambiguation buffer 182 then compares the register number into which data is written by an instruction with all of the numbers of registers previously read by threads subsequent in program order to the thread containing the "write" instruction. If the comparison reveals that a "write" instruction in an earlier thread was executed subsequent to a "read" instruction that referenced the same register and the thread containing the "read" instruction does not include an intervening "write" to the same register, global disambiguation buffer 182 signals that a data inconsistency has occurred so that appropriate corrective action can be taken in the manner discussed above with respect to the detection of a memory data inconsistency.

Multiscalar processor 100 finally includes global synchronization flags (SFs) 180, which comprise a shared resource utilized by PEs 132–138 to provide inter-thread data consistency support for register and disambiguable memory accesses. Although not required for data correctness, which is guaranteed by global disambiguation buffer 182, the data consistency support provided by global SFs 180 improves processor performance by inhibiting data speculation for identified dependencies, thereby avoiding the performance penalty incurred by misspeculation.

Figure 5:
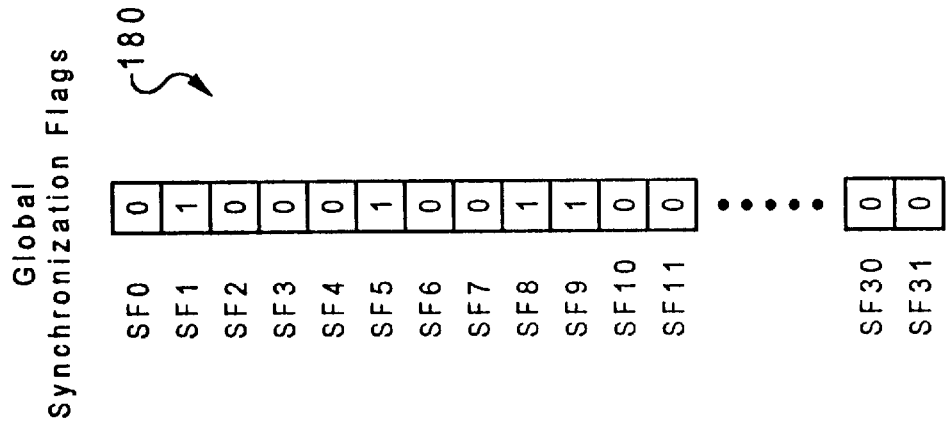
FIG. 5 illustrates a more detailed depiction of the global synchronization flags (SFs) illustrated in FIG. 4.

With reference now to FIG. 5, there is illustrated a more detailed representation of global SFs 180, which included 32 1-bit flags that are assigned to threads during compilation by multiscalar compiler 14 in order to ensure inter-thread data consistency for register and disambiguable memory accesses. A SF is cleared (set to logical zero) when the thread to which the SF is assigned is scheduled by thread scheduler 130 to one of PEs 132–138 for execution. The SF is set to logical one in response to an occurrence of a synchronization event, such as the execution of a SetFlag extension instruction in response to the production of a data value. Setting the SF notifies subsequent threads stalled by a WaitFlag extension instruction that computation dependent upon the occurrence of the synchronization event can then be performed. Importantly, the oldest (non-speculative) thread ignores all WaitFlag extension instructions since inter-thread data consistency for register and disambiguable memory accesses is guaranteed.

Multiscalar Operation

Figure 6:
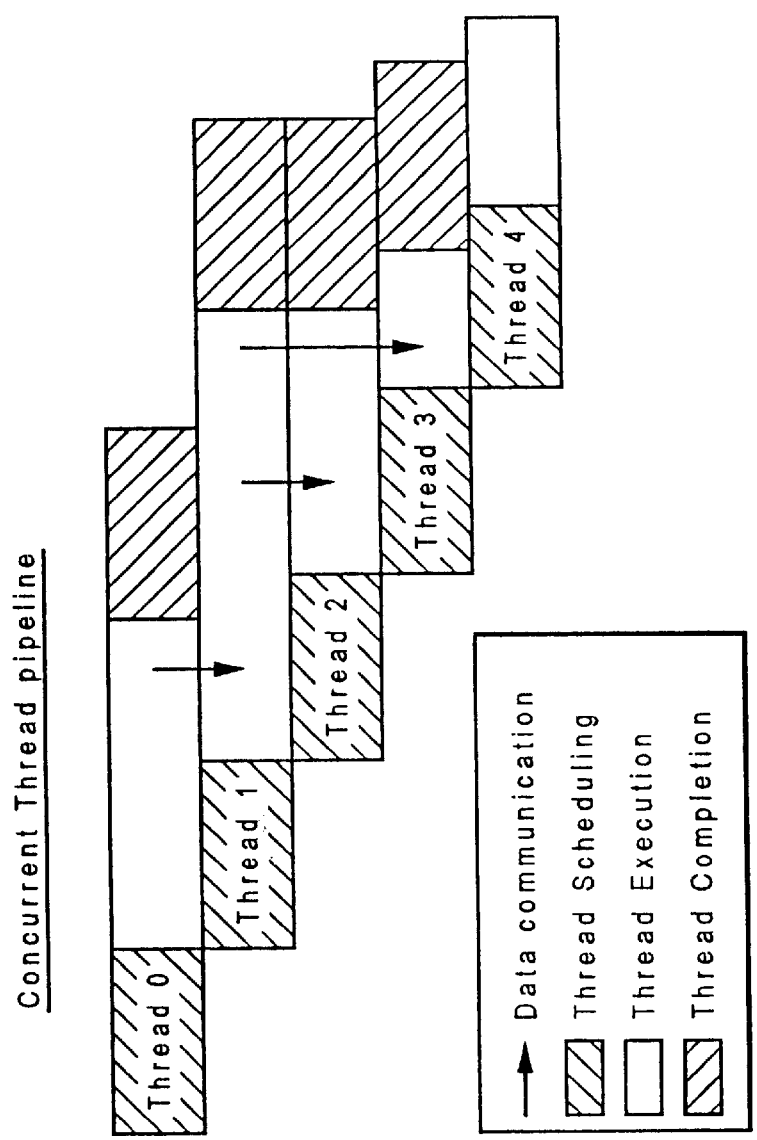
FIG. 6 depicts a timing diagram of the pipelined processing of the threads of a multiscalar program, wherein the thread pipeline includes thread scheduling, thread execution, and thread completion stages.

Referring now to FIG. 6, there is depicted a conceptual timing diagram of the pipelined processing of threads by multiscalar processor 100. As illustrated, the processing of threads by processor 100 is divided into thread scheduling, thread execution, and thread completion stages. During multiscalar execution, stages in the processing of a thread are overlapped with the same and different stages in the processing of other threads in order to mask the effects of latency.

During the thread scheduling stage of thread processing, the thread is assigned by thread scheduler 130 to one of PEs 132–138 for execution. As discussed above and as is described below in greater detail with reference to FIG. 7, once thread scheduler 130 has selected an exit point of a scheduled thread by prediction or execution of navigation code, thread scheduler 130 assigns the thread indicated by the selected exit point to one of PEs 132–138 for execution.

During the thread execution stage, a PE executes an assigned thread. It is during the execution stage that a PE communicates with PEs executing preceding threads in order to request required register or memory data. As described below with reference to FIG. 8, it is also during the thread execution stage that extension instructions are dynamically inserted into the execution stream of a PE. If execution of a thread confirms the exit selected by thread scheduler 130, the thread enters the thread completion stage. However, if upon execution a different exit of the thread is taken then was selected by thread selector 130, all subsequent threads are cancelled.

As described in greater detail below with reference to FIG. 10, during the completion stage of thread processing all modified register and memory locations of successfully completing threads are written back to the architected state maintained within architected register file 124 and L2 cache 122. Because all required data is forwarded to PEs executing subsequent threads during the thread execution stage, the thread completion stage is completely overlapped with other processing stages, thereby hiding latency.

Figure 7:
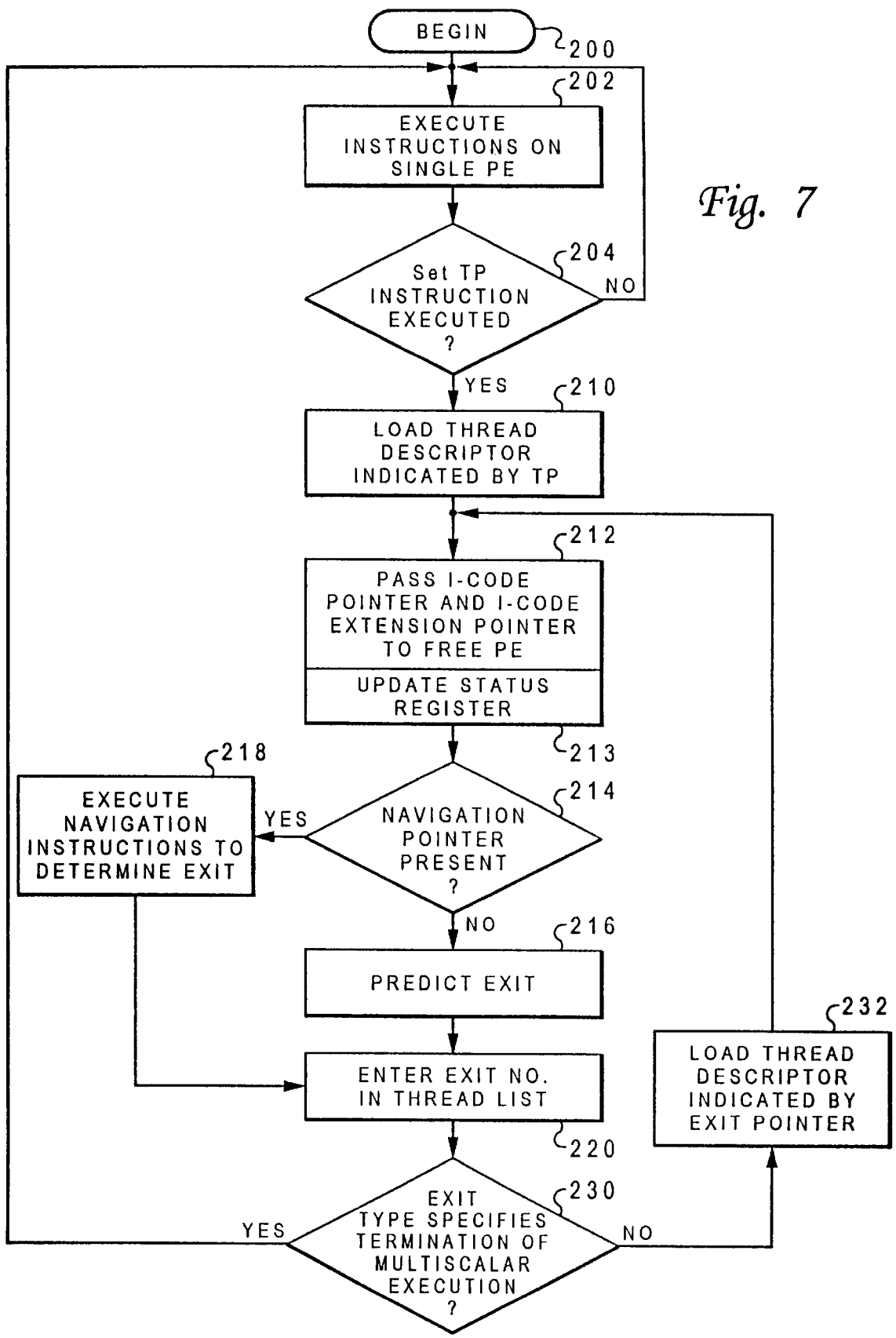
FIG. 7 is a high level logical flowchart of a method of thread scheduling when threads are processed according to logical program order.

With reference now to FIG. 7, there is illustrated a high level logical flowchart of a method of scheduling threads for execution in accordance with the illustrative embodiment of a multiscalar data processing system depicted in FIG. 4. The process shown in FIG. 7 will be described with reference to the exemplary multiscalar program depicted in FIG. 11. As illustrated, the process begins at block 200, which represents the operating system of the multiscalar data processing system depicted in FIG. 4 loading multiscalar program 400 in response to a selected command. The process then proceeds from block 200 to block 202, which depicts multiscalar processor 100 executing ISA instructions on a single one of PEs 132–138 beginning with ISA instruction 402. Next, the process proceeds to block 204, which illustrates a determination of whether or not a SetTP instruction, such as ISA instruction 404, has been executed. If not, scalar execution of ISA instructions continues on a single one of PEs 132–138, as indicated by the process returning from block 204 to block 202.

Referring again to block 204, in response to execution of SetTP instruction 404, which specifies the base address of thread descriptor 406, the process proceeds from block 204 to block 210. Block 210 depicts multiscalar processor 100 initiating multiscalar execution of multiscalar program 400 by loading the base address of thread descriptor 406 into TP 142 of thread scheduler 130. Next, as illustrated at block 212, thread scheduler 130 passes the I-Code pointer and I-Code extension pointer specified within thread descriptor 406 to a free one of PEs 132–138 in conjunction with a thread number that does not conflict with a thread number currently allocated within TL 146. As illustrated at block 213, status register 148 is then updated to indicate that the PE to which the thread was assigned is busy.

The process proceeds from block 213 to block 214, which depicts a determination is of whether or not thread descriptor 406 includes a navigation pointer. As described above, the presence of a navigation pointer within thread descriptor 406 indicates that multiscalar compiler 14 has created a set of navigation instructions that may be executed in order to resolve the inter-thread control dependency that determines which of the possible exit points of thread 406 will be taken. In response to a determination by thread scheduler 130 that thread descriptor 406 does not include a navigation pointer, the process proceeds to block 216, which illustrates exit prediction mechanism 140 predicting an exit of thread 408. The process then proceeds from block 216 to block 220. However, in response to a determination at block 214 that thread descriptor 406 includes a navigation pointer, thread scheduler 130 loads the set of navigation instructions pointed to by the navigation pointer and executes the navigation instructions in order to determine an exit of thread 408, as illustrated at block 218. As will be appreciated by those skilled in the art, the execution of navigation instructions by thread scheduler 130 entails either the inclusion of simple arithmetic and control flow execution circuitry within thread scheduler 130 or the execution of the navigation instructions within one of PEs 132–138 on behalf of thread scheduler 130. Following a determination of an exit of thread 408 at either of blocks 216 or 218, the process proceeds to block 220, which illustrates entering the selected exit number within TL 146 in association with the thread number. The process then passes to block 230.

Block 230 depicts a determination of whether or not the exit selected at one of blocks 216 and 218 was marked in thread descriptor 406 as a termination point of multiscalar execution. If so, the process returns to block 202, which depicts multiscalar processor 100 again executing ISA instructions within multiscalar program 400 utilizing only a single one of PEs 132–138. However, in response to a determination at block 230 that the selected exit was not marked by multiscalar compiler 14 as a termination point of multiscalar execution, the process proceeds to block 232. Block 232 illustrates thread scheduler 130 loading thread descriptor 410, the thread descriptor pointed to by the exit pointer in thread descriptor 406 associated with the selected exit. Thereafter, the process returns to block 212, which has been described.

Figure 8:
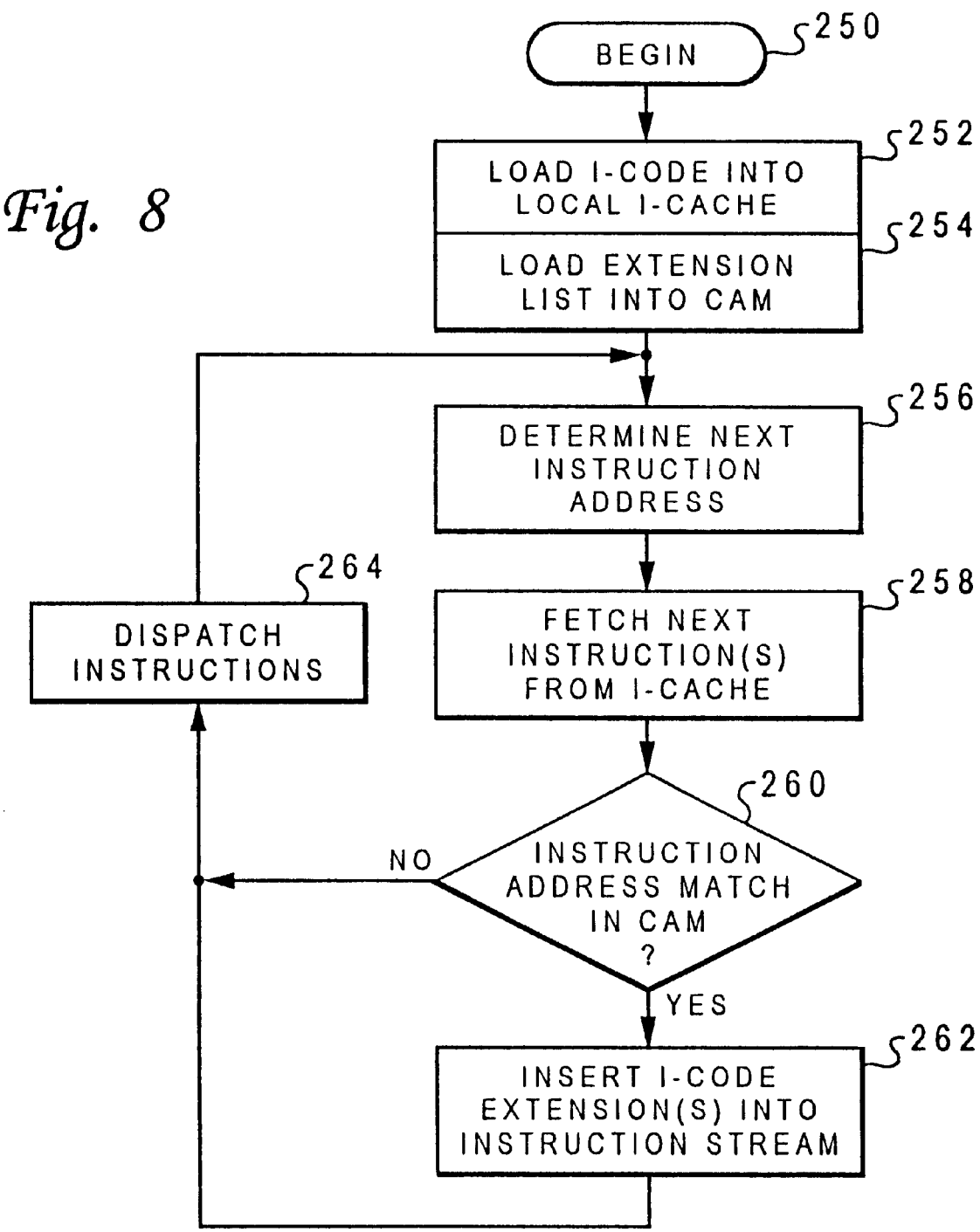
FIG. 8 is a high level logical flowchart of a method for fetching and dispatching instructions within a processing element, which illustrates the dynamic insertion of extension instructions into the instruction stream of the processing element.

Referring now to FIG. 8, there is depicted a high level logical flowchart of a method of fetching and dispatching instructions within each of PEs 132–138 of multiscalar processor 100. Although the described process is individually employed by each of PEs 132–138, only PE 132 will be referred to for the sake of simplicity. As illustrated, the process begins at block 250 in response to receipt by PE 132 of an I-Code pointer, I-Code extension pointer, and thread number from thread scheduler 130. The process then proceeds to blocks 252 and 254, which illustrate PE 132 loading the I-Code specified by the I-Code pointer into instruction cache 150 and loading the extension list specified by the I-Code extension pointer into CAM 160. Next, the process passes to block 256, which depicts the instruction sequencer within execution core 158 determining the instruction address of the next ISA instruction to be executed. As depicted at block 258, one or more instructions are then fetched from instruction cache 150 utilizing the instruction address calculated at block 256. The process proceeds from block 258 to block 260, which illustrates a determination of whether or not the instruction address of any of the instructions fetched at block 258 matches an instruction address associated with an instruction extension stored within CAM 160. If not, the process proceeds to block 264. However, in response to a determination that an instruction address of a ISA instruction fetched from instruction cache 150 has a match within CAM 160, CAM 160 furnishes the opcode of the instruction extension to the instruction sequencer of execution core 158, which inserts the extension instruction opcode into the instruction stream at a point indicated by the extension instruction. The process then passes to block 264, which illustrates the instruction sequencer of execution core 158 dispatching one or more ISA instructions and instruction extensions to the execution resources for execution. Thereafter, the process returns to block 256, which has been described.

Figure 9:
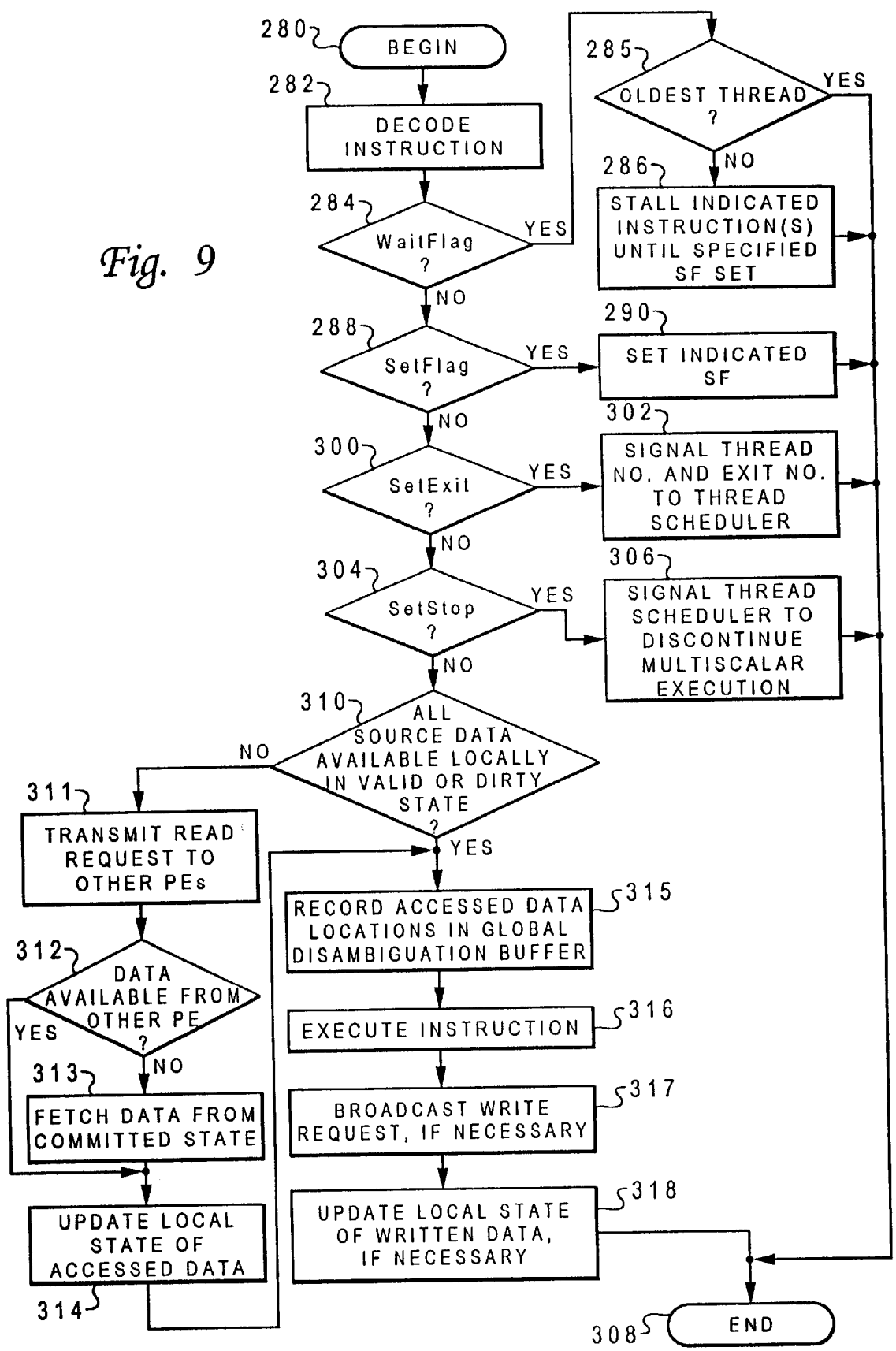
FIG. 9 is a high level logical flowchart depicting a method of executing instructions within a processing element when threads are processed in logical program order.

With reference now to FIG. 9, there is illustrated a high level logical flowchart of a method of instruction execution within execution core 158 of PE 132. As illustrated, the process begins at block 280 in response to the execution resources of execution core 158 receiving at least one instruction dispatched by the instruction sequencer. Thereafter, the process proceeds to block 282, which illustrates the execution resources of execution core 158 decoding the instruction. A determination is then made at block 284 whether or not the dispatched instruction is a WaitFlag extension instruction. If so, the process passes to block 285, which depicts a determination by execution core 158 whether or not the thread being executed is the oldest (non-speculative) thread. For example, execution core 158 can determine if it is executing the oldest thread by interrogating thread scheduler 130, which tracks the ordering of threads executing within PEs 132–138. In response to a determination that execution core 158 is executing the oldest thread, the WaitFlag extension instruction is simply discarded since data consistency is guaranteed. However, in response to a determination that execution core 158 is not executing the oldest thread, the process proceeds to block 286, which illustrates execution core 158 executing the WaitFlag extension instruction by stalling execution of at least one instruction until the specified one of global SFs 180 is set. According to a preferred embodiment, the WaitFlag extension instruction specifies whether the subsequent ISA instruction or all ISA instructions within the thread are to be stalled. The process then terminates at block 308 until the next instruction is received by the execution resources.

Returning to block 284, in response to a determination that the dispatched instruction is not a WaitFlag extension instruction, the process proceeds to block 288, which illustrates a determination of whether or not the dispatched instruction is a SetFlag extension instruction. If so, the process passes to block 290, which depicts execution core 158 setting one of global SFs 180 indicated by the SetFlag extension instruction. The process thereafter passes to block 308 and terminates until the next instruction is received by the execution resources.

If a determination is made at block 288 that the dispatched instruction is not a SetFlag extension instruction, the process proceeds to block 300, which illustrates a determination of whether or not the dispatched instruction is a SetExit extension instruction. If so, the process proceeds to block 302, which depicts execution core 158 signalling the thread number of the thread under execution and the exit number marked by the SetExit extension instruction to thread scheduler 130. Execution core 158 preferably determines the appropriate exit number from a parameter of the SetExit extension instruction within extension list 60. PE 132 then terminates execution of the thread at block 308 and initiates the thread completion process illustrated in FIG. 10 by transmitting the thread number and exit number to thread scheduler 130.

In response to a determination at block 300 that the dispatched instruction is not a SetExit extension instruction, the process proceeds to block 304, which depicts a determination of whether or not the dispatched instruction is a SetStop extension instruction. If so, the process passes to block 306, which illustrates PE 132 signalling thread scheduler 130 to halt multiscalar execution of the multiscalar program. Thereafter, PE 132 terminates execution of the thread at block 308 and initiates the thread completion process illustrated in FIG. 10 in the manner which has been described. Thus, as illustrated in FIG. 11, if a SetStop extension instruction is executed at the exit of thread 420, execution of multiscalar program 400 continues in a scalar fashion on a single PE.

Referring again to FIG. 9, in response to a determination at block 304 that the dispatched instruction is not SetStop extension instruction, the process passes to blocks 310–317, which illustrates the execution of an ISA instruction by execution core 158. Referring first to block 310, in response to a read signal from execution core 158, a determination is made whether or not all of the source data required to execute the ISA instruction is available locally within GPR cache 154 and data cache 156 in any of data coherency states 502–508. If so, the process proceeds to block 315, thereby signifying that execution core 158 can access the required data locally. However, in response to a determination that the required data is not owned locally, the process proceeds to block 311, which depicts communication and synchronization logic 152 transmitting a read request on local communication and synchronization mechanism 170 that indicates the required memory address or register number. As described above, PEs having the requested data in any of data coherency states 502–508 will respond to the read request by indicating ownership of the requested data. Arbitration logic 172 then signals the responding PE executing the nearest preceding thread in logical program order to place the requested data on local communication and synchronization mechanism 170. As illustrated at block 312, if a PE responds to the read request, the process proceeds to block 314. However, if none of PEs 132–138 responds to the read request, the process passes to block 313, which illustrates the PE fetching the required data from the committed state, that is, from either L2 cache 122 or architected register file 124. The process then proceeds to block 314, which illustrates communication and synchronization logic 152 updating the data coherency state of the local data location containing the requested data to valid state 502. Thereafter, the process passes to block 315.

Block 315 depicts communication and synchronization logic signalling global disambiguation buffer 182 with the memory addresses and register numbers accessed to obtain data for the ISA instruction. As described above, global disambiguation buffer 182 records these data location identifiers for subsequent comparison with data locations written by threads that precede the current thread in program order. The process then proceeds to block 316, which illustrates the execution resources of execution core 158 executing the ISA instruction, possibly generating result data that is written to a local data location. As illustrated at block 317, communication and synchronization logic then broadcasts a write request indicating the register number(s) or memory address (es), if any, written in response to execution of the ISA instruction. As described above with reference to FIG. 13, the communication and synchronization logic 152 within PEs that are executing threads subsequent to the signalling thread in program order and that have the indicated data location(s) in valid state 502 or dirty state 504 updates the state of the indicated data locations to the appropriate one of valid hazard state 506 and dirty hazard state 508. The data location identifiers broadcast at block 317 are also processed by global disambiguation buffer 182 in order to check for data dependencies. The process proceeds from block 316 to block 317, which illustrates communication and synchronization logic 152 updating the local state of data locations written in response to execution of the ISA instruction, if necessary. Thereafter, the process passes to block 308 and terminates until the next instruction is dispatched to the execution resources of execution core 158 for execution.

Figure 10:
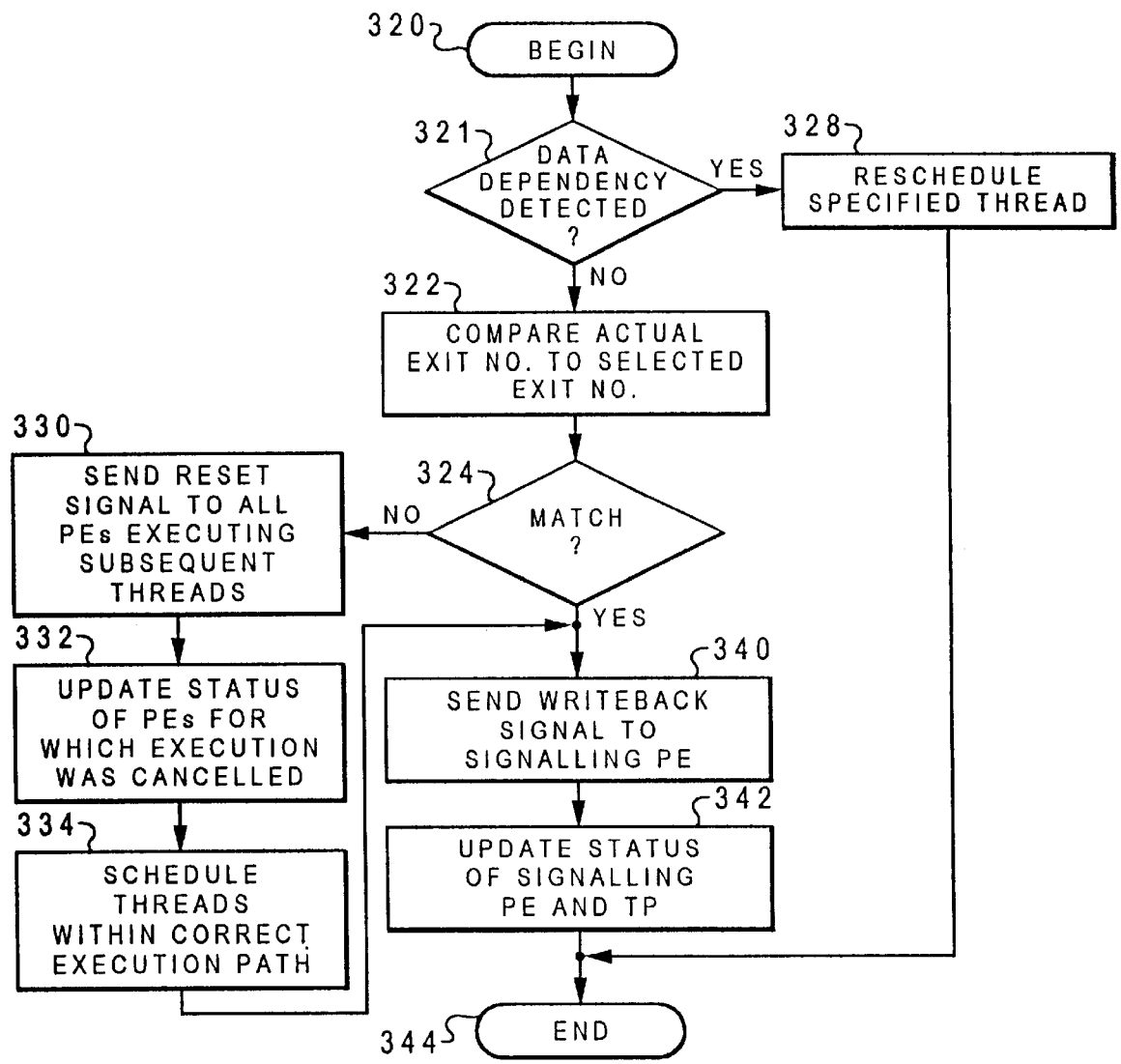
FIG. 10 is a high level logical flowchart illustrating a method of completing threads when threads are processed in logical program order.
Figure 11:
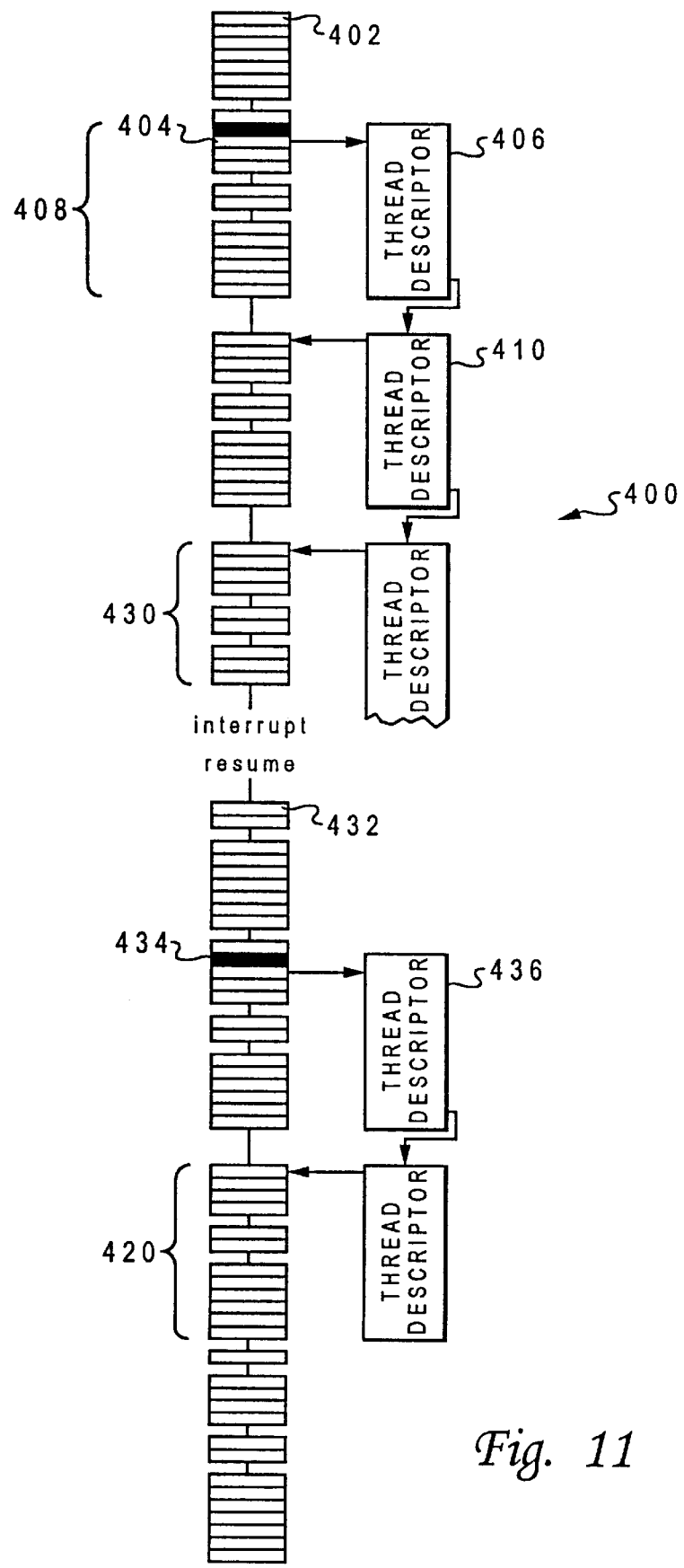
FIG. 11 illustrates the execution of the Thread Code (T-Code) and Instruction Code (I-Code) streams comprising a multiscalar program, wherein multiscalar execution of the multiscalar program is initiated by a SetTP instruction embedded within the I-Code stream.

With reference now to FIG. 10, there is depicted a high level logical flowchart of a method of thread completion within multiscalar processor 100. According to the illustrative embodiment, threads are completed according to logical program order. As illustrated, the process begins at block 320 in response to receipt by thread scheduler 130 of a thread number and exit number from one of PEs 132–138. The process then proceeds to block 321, which illustrates a determination of whether or not a data dependency was detected during execution of the specified thread. If so, the process passes to block 328, which illustrates thread scheduler sending a reset signal to the signalling PE to invalidate the local data and rescheduling the specified thread for execution within the signalling PE. Thereafter, the process terminates at block 344. Referring again to block 321, in response to a determination that no data dependency was detected during the execution of the specified thread, the process proceeds to block 322.

Block 322 depicts thread scheduler 130 comparing the actual exit number received from the signalling PE with the selected exit number associated with the indicated thread number in TL 146. As illustrated at block 324, a determination is then made whether or not the actual exit number indicated by the signalling PE matches the predicted exit number associated with the thread number in TL 146. If so, the process passes to block 340, which is described below. However, if the actual exit number does not match the exit number recorded in TL 146, the process proceeds to block 330, which depicts thread scheduler 130 sending a reset signal to all PEs executing threads subsequent to the specified thread in program order. Thus, as illustrated at block 330, the occurrence of a control (but not data) hazard requires the cancellation of all subsequent speculative threads. The process then passes to block 332, which depicts thread scheduler 130 updating status register 148 to mark the PEs for which execution was cancelled as free. Next, the process proceeds to block 334, which illustrates thread scheduler 130 scheduling the threads (in accordance with the method depicted in FIG. 7) within the correct execution path. The process then proceeds to block 340.

Block 340 depicts thread scheduler 130 sending a writeback signal to the signalling PE. In response to receipt of the writeback signal, the PE writes back all data locations in dirty state 504 and dirty hazard state 508 to the appropriate one of architected register file 124 and L2 cache 122. In addition, the state of updated locations within L2 cache 122 are marked as valid. The process then passes from block 340 to block 342, which illustrates thread scheduler 130 updating status register 148 to indicate that the signalling PE is free. In addition, TP 142 is updated to point to the thread descriptor indicated by the exit pointer associated with the actual exit point of the completed thread. Thereafter, the process terminates at block 344.

In the hereinbefore described process of thread processing, exceptions occurring during the execution of a multiscalar program are only taken in scalar execution mode. Thus, as illustrated in FIG. 11 at reference numeral 430, PEs 132–138 simply quit execution of threads and return to an idle state in response to the occurrence of an exception. An appropriate exception handler is then executed on one of PEs 132–138. Thereafter, scalar execution of the ISA instructions within multiscalar program 400 is resumed on a single one of PEs 132–138, as depicted at reference numeral 432. Execution of ISA instructions continues in scalar mode until the execution of SetTP instruction 434, which as described above, initializes TP 142 with the base address of thread descriptor 436, thereby restarting concurrent execution of multiple threads.

Out-of-Order Operation

Heretofore, it has been assumed that threads within a multiscalar program are assigned by thread scheduler 130 to PEs 132–138 according to logical program order. However, even greater levels of ILP may be achieved by scheduling threads to PEs 132–138 for speculative out-of-order execution, if a high percentage of the out-of-order threads are data independent from preceding threads.

Figure 14:
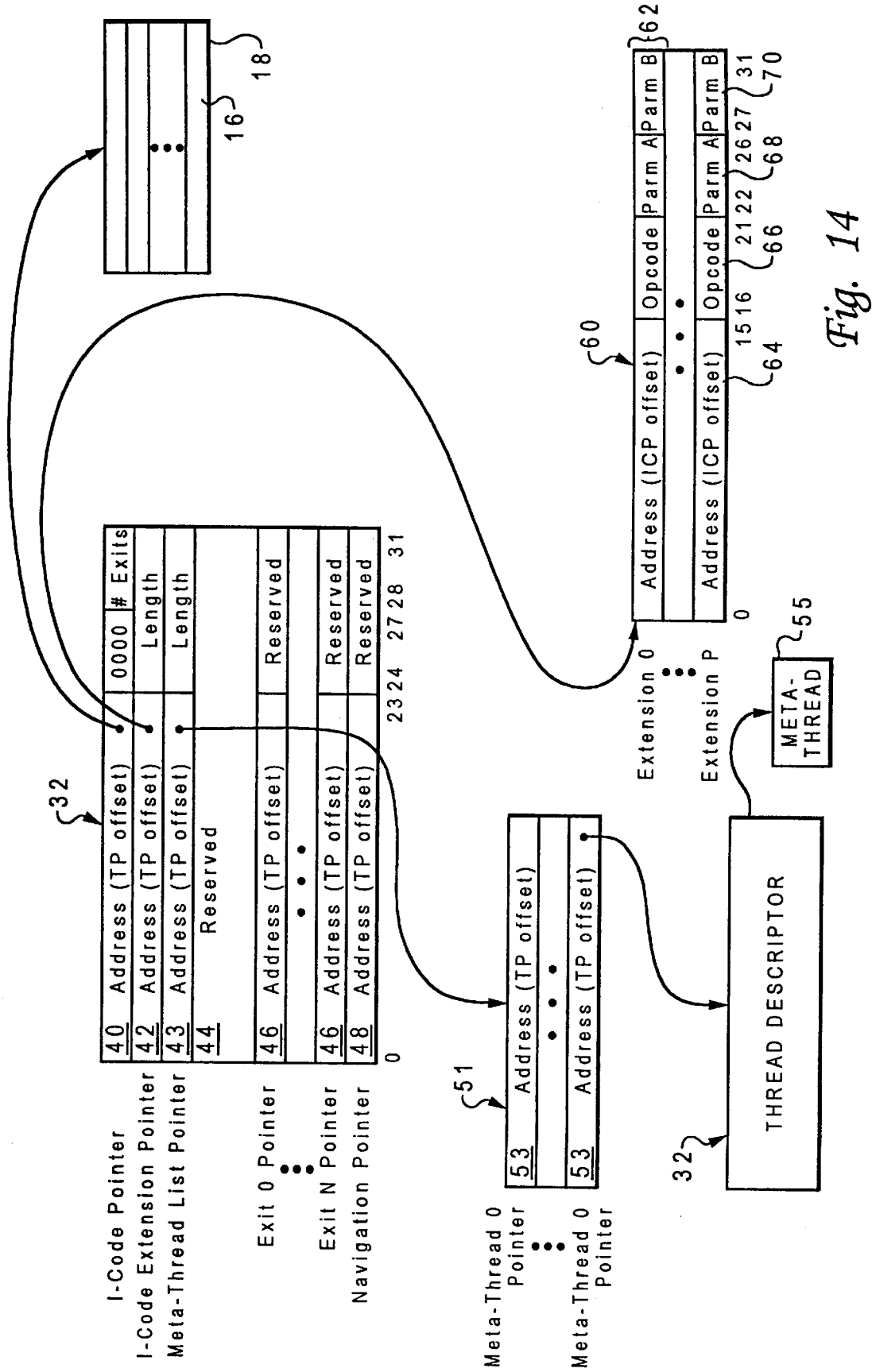
FIG. 14 depicts an illustrative embodiment of a T-Code thread descriptor utilized to support out-of-order execution of threads.

In order to support out-of-order thread execution, it is desirable to make a number of enhancements to the software and hardware architectures described above. First, referring now to FIG. 14, there is depicted an illustrative embodiment of a thread descriptor generated by multiscalar compiler 14 to support out-of-order execution of threads. As is apparent upon comparison of FIGS. 2 and 14, the thread descriptor 32 illustrated in FIG. 14 is identical to that depicted in FIG. 2, except for the inclusion of meta-thread list pointer 43. Meta-thread list pointer 43 is a 24-bit pointer that indicates, relative to TP 142, the base address of meta-thread list 51, which contains one or more 24-bit meta-thread pointers 53. As illustrated, each meta-thread pointer 53 specifies the base address of a thread descriptor 32 associated with a meta-thread 55 that is to be scheduled to one of PEs 132–138 for out-of-order execution. Unlike the thread 18 to which I-Code pointer 40 points, the meta-threads 55 indirectly specified by meta-thread pointers 53 do not logically follow the thread preceding thread 18 in logical program order. Instead, meta-threads 55 are threads identified by multiscalar compiler 14 at block 96 of FIG. 1B as control independent from preceding threads once the execution path has reached thread 18 (i.e., each meta-thread 55 will be executed regardless of which exit of thread 18 is taken). Thus, meta-threads 55 can be executed out-of-order with respect to the logical ordering of threads under the assumption that hardware within multiscalar processor 100 will detect and correct for any unidentified data dependencies between meta-threads 55 and preceding threads.

Figure 15:
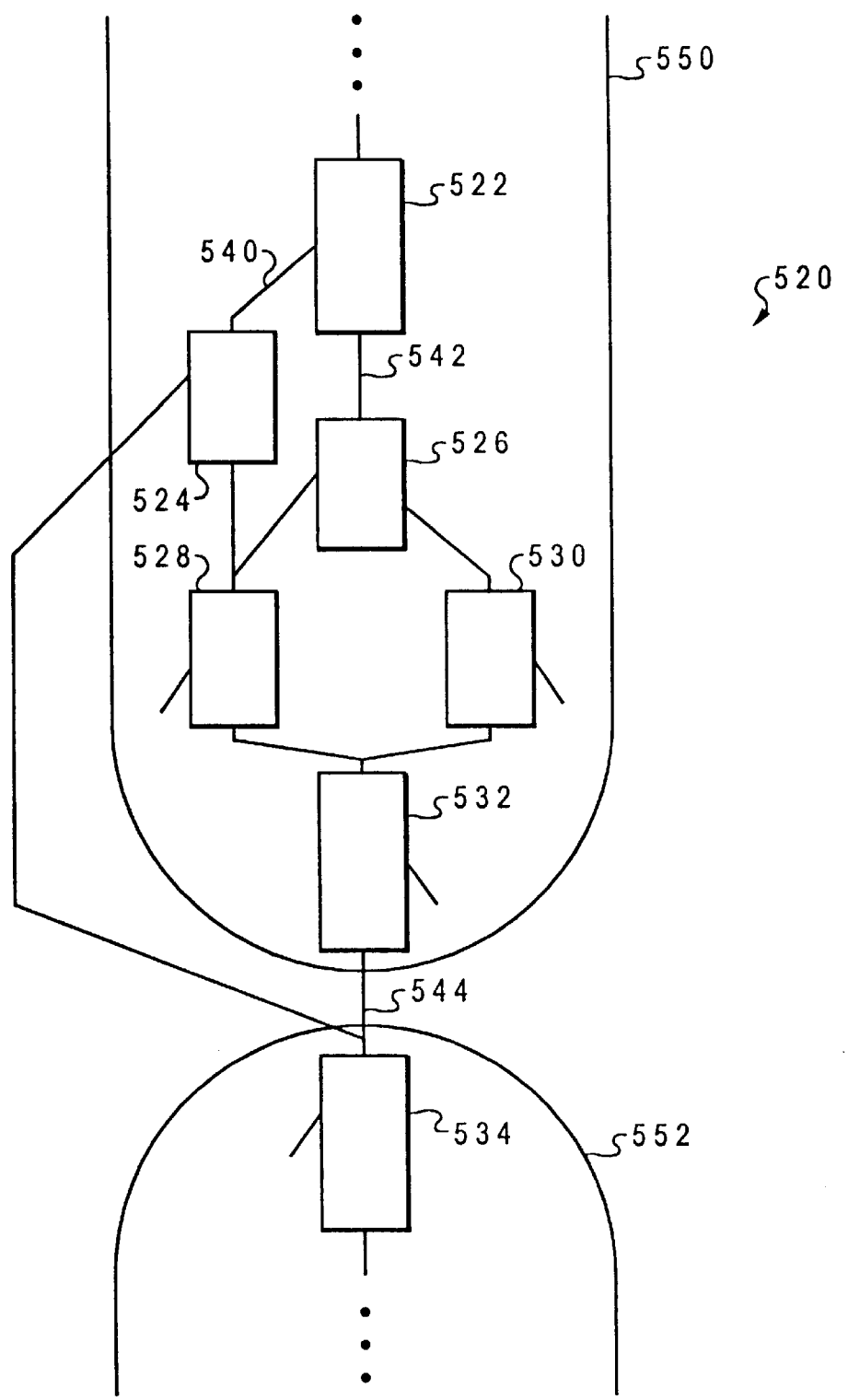
FIG. 15 illustrates the partitioning of threads within a multiscalar program into multiple thread regions.

According to the illustrative embodiment, data dependencies between meta-threads and preceding threads are handled at thread completion on a thread region-by-thread region basis, where each meta-thread defines a thread region including the meta-thread and all subsequent threads that logically precede the next meta-thread, if any, in program order. For example, with reference now to FIG. 15, there is illustrated a multiscalar program 520 including threads 522–534, which are depicted in logical program order. As illustrated, thread 522 includes a first possible exit point 540, which if taken causes thread 524 to be executed, and a second possible exit point 542, which if taken causes thread 526 to be executed. Because thread 534 will be executed regardless of which of possible exit points 540 and 542 is actually taken during execution, multiscalar compiler 14 designates thread 534 as a meta-thread child of thread 522 by creating a meta-thread pointer 43 in the thread descriptor 32 associated with thread 522. As illustrated, thread 522 and all logically subsequent threads preceding meta-thread 534 comprise a first thread region 552, and meta-thread 534 and all logically subsequent threads preceding the next meta-thread comprise a second thread region 552.

In order to permit multiscalar processor 100 to identify the boundary between first thread region 550 and second thread region 552, multiscalar compiler 14 creates, within the thread descriptor of thread 532, an exit pointer associated with possible exit point 544 that specifies the base address of the thread descriptor of meta-thread 534 (as would be the case for in-order thread execution). In addition, multiscalar compiler 14 indicates that possible exit point 544 of thread 532 crosses a thread region boundary between first thread region 550 and second thread region 552 by creating a region boundary exit identifier within the 8-bit reserved section following the exit pointer.

Two principal hardware enhancements are made to multiscalar processor 100 in order to support out-of-order thread processing. First, thread scheduler 130 is modified to include four instances of the thread scheduling hardware hereinbefore described. Each instance of thread scheduler 130 is associated with a particular one of the four thread regions in which PEs 132–138 may possibly be executing. A separate TL 146 is utilized by each instance of thread scheduler 130 to track the exit predictions made within the associated thread region. In contrast to TL 146, TP 142, status register 148, and exit prediction mechanism 140 are shared between the four instances of thread scheduler 130.

Second, global disambiguation buffer 182 preferably includes four thread region buffers that are each associated with a respective one of the four possible thread regions in which PEs 132–138 can execute. Like the embodiment of global disambiguation buffer 182 described above with respect to in-order execution, each thread region buffer accumulates the register numbers and memory addresses from which threads within the associated thread region read data and the register numbers and memory addresses to which threads within the associated thread region write data. These data location identifiers are utilized to detect intra-region data consistency in the manner described above. In addition, as described below with reference to FIG. 18, the identifiers of data locations written by threads within a thread region are utilized during thread completion to verify that all inter-region data dependencies are observed.

Figure 16:
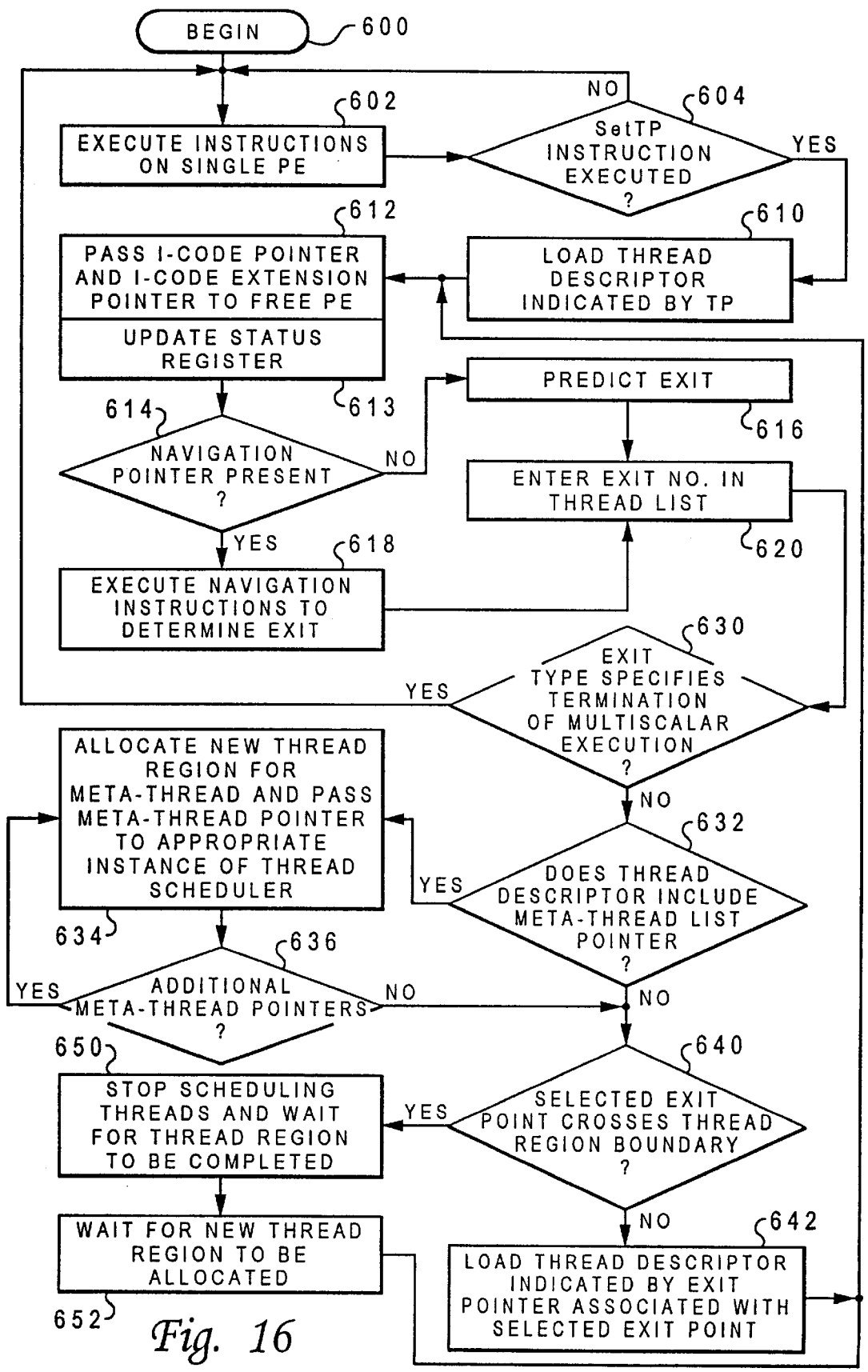
FIG. 16 is a high level logical flowchart depicting a method of scheduling threads for out-of-order execution.

Referring now to FIG. 16 there is depicted a high level logical flowchart of a method of scheduling threads in a multiscalar processor that supports out-of-order thread execution. FIG. 16 illustrates the steps performed by each of the four instances of thread scheduler 130 to schedule threads within its associated thread region. As illustrated, the process begins at block 600 and thereafter proceeds to blocks 602–820, which illustrate the first instance of thread scheduler 130 loading a thread descriptor, initiating execution of the associated thread within one of PEs 132–138, selecting one of the exits of the thread, and storing the exit selection within TL 146, in the manner which has been described above with reference to blocks 202–220 of FIG. 7.

The process proceeds from block 620 to block 630, which illustrates a determination of whether or not the exit type of the selected exit specifies that multiscalar execution is to be terminated. If so, the process returns to block 602, which illustrates the resumption of scalar execution by a single one of PEs 132–138. However, in response to a determination at block 630 that the exit type of the selected exit does not specify the termination of multiscalar execution, the process proceeds to block 632, which illustrates the first instance of thread scheduler 130 determining whether the currently loaded thread descriptor includes a meta-thread list pointer 43. If not, the process passes to block 640, which is described below. However, in response to a determination that the thread descriptor includes a meta-thread list pointer 43, the process proceeds to block 634, which depicts the first instance of thread scheduler 130 allocating a new thread region and passing a meta-thread pointer 53 within meta-thread list 51 to a second instance of thread scheduler 130 so that the second instance of thread scheduler 130 can load the thread descriptor associated with the meta-thread 55 and begin the thread scheduling process illustrated in FIG. 16 at block 612. The process then proceeds from block 634 to block 636, which illustrates a determination by the first instance of thread scheduler 130 whether or not additional meta-thread pointers are present within meta-thread list 51. If so, the process returns to block 634, which illustrates the first instance of thread scheduler 130 passing a next meta-thread pointer 53 to a third instance of thread scheduler 130. Referring again to block 636, in response to a determination that all meta-thread pointers 53 within meta-thread list 51 have been passed to other instances of thread scheduler 130, the process proceeds from block 636 to block 640.

Block 640 illustrates a determination of whether or not the exit type of the selected exit point indicates that the exit point of the current thread defines a boundary between two thread regions. If not, the process proceeds to block 642, which illustrates the first instance of thread scheduler 130 loading the thread descriptor indicated by the exit pointer associated with the selected exit point. The process then returns to block 612, which illustrates the first instance of thread scheduler 130 processing the new thread descriptor. Returning to block 640, in response to a determination that the exit type of the selected exit point indicates that the selected exit point defines a thread region boundary, the process proceeds to block 650, which depicts the first instance of thread scheduler 130 discontinuing the scheduling of threads and waiting for the associated thread region to be completed. Of course, if a data or control hazard is detected within the thread region while the first instance of thread scheduler 130 is waiting at block 650, the first instance of thread scheduler 130 recovers from the detected hazard by scheduling the appropriate thread(s). Following block 650, the process passes to block 652, which illustrates the first instance of thread scheduler 130 waiting for a new thread region to be allocated in the manner described above with reference to block 634. In response to receipt of a meta-thread pointer 53 by the first instance of thread scheduler 130, the process returns to block 612, which has been described.

Figure 17:
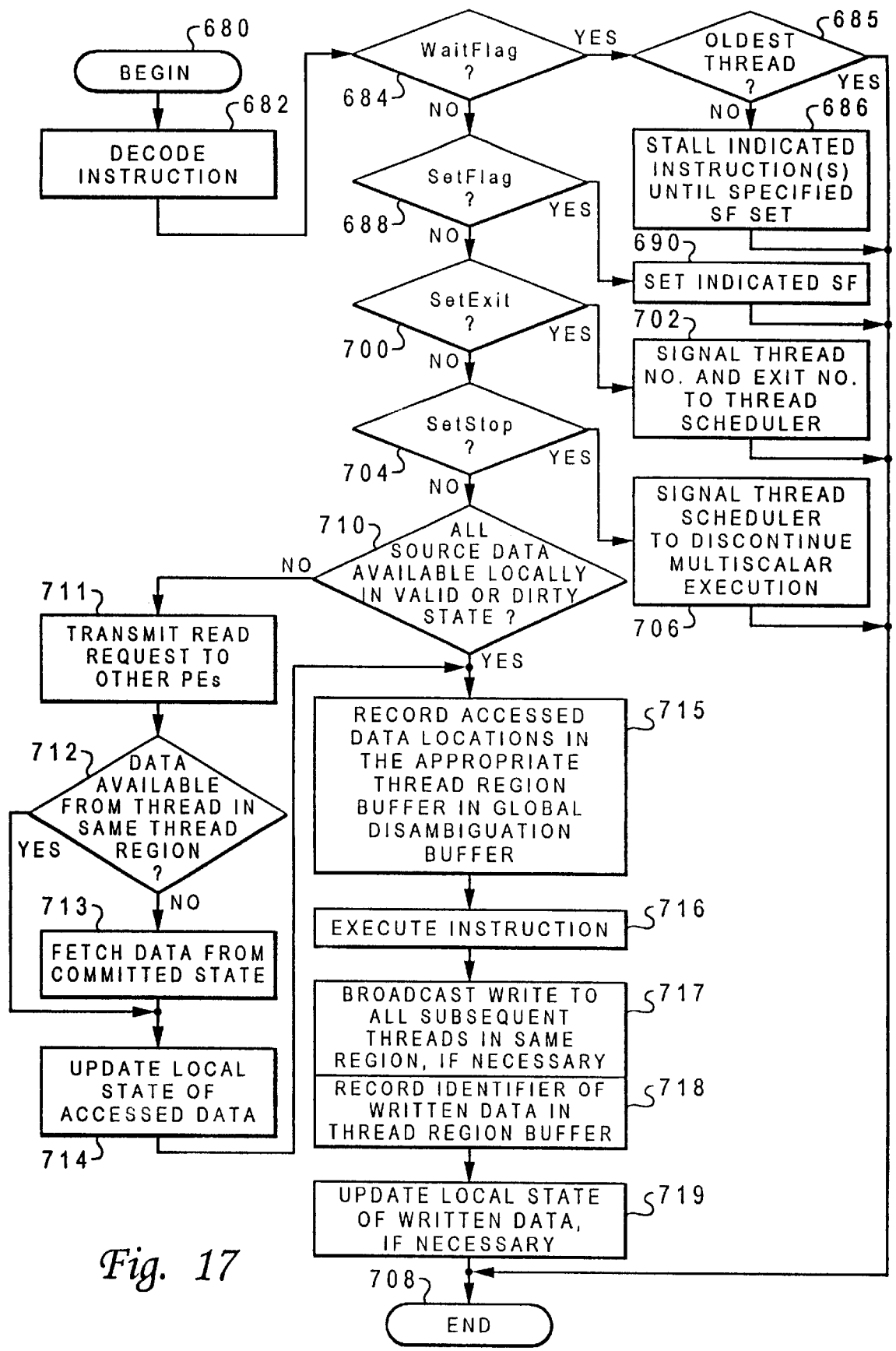
FIG. 17 is a high level logical flowchart illustrating a method of executing instructions within a processing element when threads are processed out-of-order.

With reference now to FIG. 17, there is illustrated a high level logical flowchart of a method of executing instructions within the PE of a multiscalar processor that supports out-of-order thread execution. As illustrated, the process begins at block 680 in response to receipt of an instruction dispatched to the execution resources of execution core 158 in accordance with the method described above with reference to FIG. 8. The process then proceeds to blocks 682–706, which correspond to blocks 282–306 of FIG. 9 and accordingly are not further described here.

Referring now to block 704, in response to a determination that the dispatched instruction is not a SetStop extension instruction, thereby indicating that the dispatched instruction is an ISA instruction, the process proceeds to block 710. Block 710 illustrates a determination of whether or not all of the source data required to execute the dispatched ISA instruction are available locally in any of data coherency states 502–508. If so, the process passes to block 715, which is described below. However, in response to a determination that all of the source data required to execute the ISA instruction are not available locally within GPR cache 154 and data cache 156, the process proceeds to block 711, which depicts communication and synchronization logic 152 transmitting a read request on local communication and synchronization mechanism 170 that indicates the memory address or register number containing the required data as well as the number of the thread region in which the PE is executing. A PE snooping local communication and synchronization mechanism 170 responds to the read request if the PE is executing an earlier thread within the same thread region and owns the requested data in one of data coherency states 502–508. As illustrated at block 712, if the required data is available from another PE executing a thread in the same thread region as the requesting PE, the process passes to block 714. However, in response to a determination at block 712 that the required data is not available from another PE executing within the same thread region, the process proceeds to block 713, which illustrates the requesting PE fetching the required data from L2 cache 122 or architected register file 124. The process then passes to block 714, which depicts communication and synchronization logic 152 updating the data state of the accessed data to valid state 502. Thereafter, the process proceeds to block 715.

Block 715 illustrates communication and synchronization logic 182 transmitting the identifier of each data locations accessed to obtain an operand for the ISA instruction to the appropriate thread region buffer within global disambiguation buffer 182. Next, as depicted at block 716, the execution resources of execution core 158 execute the ISA instruction. The process then proceeds to block 717, which illustrates communication and synchronization logic 152 broadcasting a write request on logic communication and synchronization mechanism 170 that indicates to all subsequent threads within the same thread region each memory address or register number, if any, written in response to execution of the ISA instruction. In addition, as depicted at block 718, communication and synchronization logic 152 records the register number or memory address of each data location written by the ISA instruction in the thread region buffer associated with the current thread region. As described below with respect to FIG. 18, the information within the thread region buffer is utilized to correct for inter-region data dependencies upon the completion of all threads within the current thread region. The process then proceeds from block 717 to block 718, which illustrates communication and synchronization logic 152 updating the local state of data locations written in response to execution of the ISA instruction. Thereafter, the process terminates at block 708.

Figure 18:
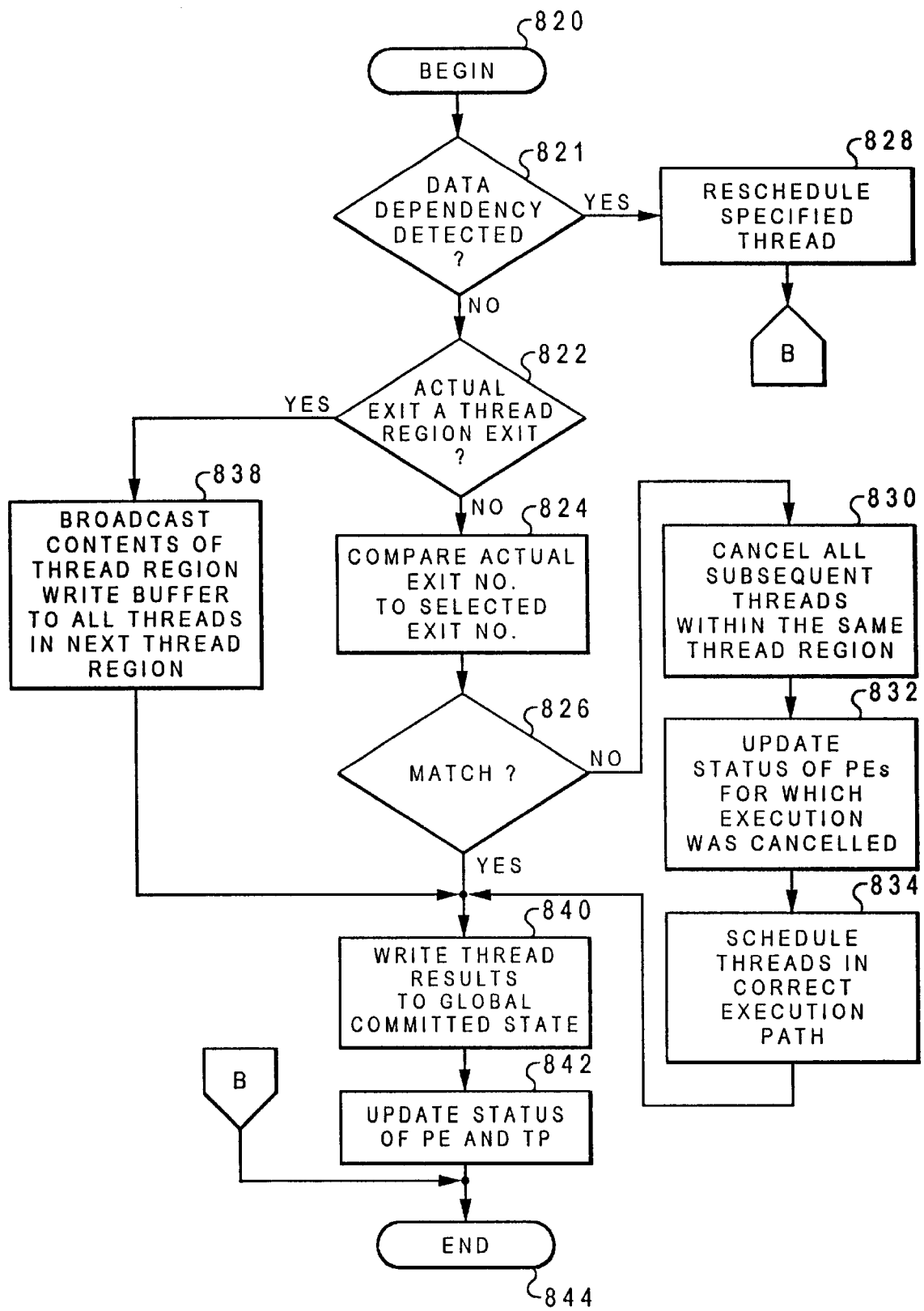
FIG. 18 is a high level logical flowchart depicting a method of completing threads when threads are processed out-of-order.

Referring now to FIG. 18, there is depicted a high level logical flowchart of a method of thread completion within a multiscalar processor that supports out-of-order thread execution. As illustrated, the process begins at block 820, in response to receipt of a thread number and exit number by the instance of thread scheduler 130 associated with the thread region to which the executed thread belongs. The process proceeds from block 820 to block 821, which depicts a determination of whether or not a data dependency was detected during execution of the specified thread. If so, the process proceeds to block 828, which illustrates the instance of thread scheduler 130 sending a reset signal to the signalling PE to invalidate all local data and rescheduling the specified thread for execution by the signalling PE. The process then passes to block 844 through page connector B and terminates.

Referring again to block 821, in response to a determination at block 821 that no data dependency was detected during the execution of the specified thread, the process proceeds to block 822, which illustrates a determination of whether or not the exit type of the exit pointer associated with the actual exit point of the executed thread indicates that the exit point defines a thread region boundary. If so, the process proceeds to block 838, which illustrates the instance of thread scheduler 130 causing the identifiers of all data locations written by threads within the current thread region to be broadcast from the thread region buffer associated with the current thread region to all threads within the immediately subsequent thread region. As described above with reference to FIG. 13, PEs executing threads within the subsequent thread region utilize the broadcast write requests to update the data coherency state of data locations in valid state 502 and dirty state 504 to valid hazard state 506 and dirty hazard state 508, respectively. In addition, the identifiers of data locations written by threads within the current thread region are transferred to the thread region buffer associated with the immediately subsequent thread region so that global disambiguation buffer 182 can check for interthread data dependencies between the immediately subsequent thread region and the current thread region. The process then passes to block 840.

With reference again to block 822, in response to a determination that the actual exit taken by the executed thread does not define a thread region boundary, the process proceeds to block 824, which depicts the instance of thread scheduler 130 comparing the actual exit number received from the signalling PE with the exit number associated with the thread number in TL 146. A determination is then made at block 826 whether or not the actual exit number indicated by the signalling PE matches the selected exit number associated with the thread number in TL 146. If so, the process passes to block 840, which is described below. If the actual and selected exit numbers do not match, however, the process proceeds from block 824 to block 830, which illustrates the instance of thread scheduler 130 sending a reset signal to all PEs that are executing threads within the current thread region that are subsequent to the completed thread. Thus, in contrast to the in-order execution case, the detection of a control hazard during out-of-order execution requires only the cancellation of all subsequent threads within the same thread region and not all subsequent threads.

The process proceeds from block 830 to block 832, which illustrates the instance of thread scheduler 130 updating status register 148 to mark the PEs for which execution was cancelled as free. Next, the process passes to block 834, which illustrates the instance of thread scheduler 130 scheduling threads within the correct execution path in accordance with the method depicted in FIG. 16. The process then passes to block 840.

Block 840 illustrates the instance of thread scheduler 130 transmitting a writeback signal to the signalling PE, which in response to receipt of the writeback signal, writes back dirty (modified) registers and memory addresses to L2 cache 122 and architected file 124. The process then proceeds to block 842, which illustrates the instance of thread scheduler 130 updating status register 148 to indicate that the signalling PE is free. On addition, TP 142 is updated to point to the thread associated with the exit point of the completed thread. The process then terminates at block 844.

As will be appreciated from the foregoing description, the multiscalar software and hardware architectures disclosed herein provide numerous advantages over prior art superscalar, multiprocessor, and multiscalar data processing systems. By providing linked thread descriptors within a T-Code stream that is parallel to, yet separate from the I-Code stream, the present multiscalar software architecture avoids the performance degradation experienced in prior art multiscalar systems due to an increase in program length. Maintaining separate processing paths for the T-Code and I-Code streams and providing hardware and software support for the dynamic insertion of auxiliary instructions within the I-Code stream ensures backward compatibility between the multiscalar software architecture described herein and scalar object code executable by conventional processors. The dynamic insertion of auxiliary instructions within the I-Code stream and the possibility of including a single instruction within multiple threads further permits a single instruction to be associated with multiple instruction extensions. Thus, an instruction within a first thread, which produces a particular register value and 11 is therefore associated with a SetFlag extension instruction within the extension list of the first thread, may also be included in a second thread and associated with a second SetFlag extension instruction within the extension list of the second thread.

Furthermore, the data consistency support provided by the SetFlag/WaitFlag paradigm permits multiple instructions to be synchronized utilizing a single execution control facility that may be employed for both register accesses and disambiguable memory accesses. In contrast to prior art data processing systems, the hardware and software architectures herein disclosed support both speculative and non-speculative execution of multiple threads through the generation of navigation instructions executable by the thread scheduler. The execution of navigation instructions by the thread scheduler reduces the amount of speculative work that is discarded in response to exit mispredictions, thereby enhancing IPC performance.

Moreover, from the foregoing description of out-of-order thread processing, it should be apparent that partitioning multiscalar programs into thread regions in this manner has a number of advantages. First, inter-region thread interaction is minimized through the use of different protocols for inter-region and intra-region thread interaction. According to the illustrative embodiment, the inter-thread data coherency communication and SetFlag/WaitFlag extension instructions are utilized during the thread execution stage of out-of-order thread processing to maintain data coherency and register data consistency between threads within the same thread region. However, because threads in different thread regions are executed under the assumption of inter-region data and control independence, data coherency communication between threads in different thread regions is eliminated and verification of register data consistency is deferred until the thread completion stage of thread processing, which is performed according to the logical program order of thread regions.

Second, delaying the verification of data consistency until thread writeback has the advantage that computation performed by a meta-thread is not discarded in response to speculative execution of threads within a mispredicted execution path upon which execution of the meta-thread is seemingly dependent. For example, with reference again to FIG. 15, if an instruction in thread 534 has an apparent register data dependency upon an instruction in thread 526 and possible exit point 542 of thread 522 is predicted, thread 534 and subsequent threads within thread region 552 are not cancelled if it is determined that the exit point of thread 522 was mispredicted.

Third, the recovery activities performed in response to the detection of data hazard during out-of-order thread processing entail a potentially smaller performance penalty than those performed in response to the detection of a control or data hazard during in-order thread processing. As described above and as illustrated at block 330 of FIG. 10, for in-order thread processing the detection of a control hazard during thread writeback entails the cancellation of all threads subsequent to the thread being processed. In contrast, the detection of a control hazard between threads within a thread region only requires that subsequent threads within the same thread region be cancelled. Thus, the discarding of control independent work is eliminated.

Fourth, thread regions permit greater utilization of a limited shared resource, such as SFs 180, by allocating a separate instance of the shared resource to each thread region. For example, assume that SFs 180 include four instances of 32 SFs each, where each instance of SFs 180 is identified by a respective one of thread regions 0-3 so that a PE must transmit both a thread region number and a SF number in order to set a SF. In addition, referring again to FIG. 15, assume that thread 522, which is in thread region 0, contains a "write" instruction having an associated SetFlag extension instruction that sets SF4 and that thread 532, which is also in thread region 0, contains a "read" instruction having an associated WaitFlag extension instruction that delays execution of the "read" instruction until SF4 is set. In this exemplary embodiment, data consistency for the "read" instruction in thread 532 is guaranteed even if meta-thread 534, which is scheduled to one of PEs 132–138 for execution immediately following thread 522, contains an instruction having an associated SetFlag extension instruction that targets SF4. Thus, organizing threads into thread regions prevents contention for shared resources between threads in different regions and minimizes the complexity of the processor hardware required to track utilization of shared resources by out-of-order threads.

While an illustrative embodiment has been particularly shown and described, it will be understood by those skilled in the art that various changes in form and detail may be made therein without departing from the spirit and scope of the illustrative embodiment. For example, although aspects of the illustrative embodiment have been described with respect to specific "method steps" implementable within a data processing system, those skilled in the art will appreciate from the foregoing description that the illustrative embodiment can alternatively be implemented as a computer program product for use with a data processing system. Such computer program products can be delivered to a computer via a variety of signal-bearing media, which include, but are not limited to: (a) information permanently stored on nonwritable storage media (e.g., CD-ROM); (b) information alterably stored on writable storage media (floppy diskettes or hard disk drives); or (c) information conveyed to a computer through communication media, such as through a computer or telephone network. It should be understood, therefore, that such signal-bearing media, when carrying computer readable instructions that direct the method functions of the illustrative embodiment, represent alternative embodiments.

What is claimed is:

1. A method of executing a program within a processor, said method comprising:

supplying, to said processor, a program including a plurality of threads and a plurality of thread descriptors that are each associated with a respective one of said plurality of threads, wherein each thread includes a plurality of program instructions;

identifying, in one or more of said plurality of thread descriptors, a respective set of auxiliary instructions to be executed as part of the associated thread;

in response to said processor processing a thread within said program for which the associated thread descriptor identifies a set of auxiliary instructions:

automatically inserting at least one auxiliary instruction from said set of auxiliary instructions into the processor's instruction stream at a position in the instruction stream indicated by the associated thread descriptor; and executing said at least one auxiliary instruction within said processor.

2. The method of claim 1, and further comprising storing each set of auxiliary instructions separately from said plurality of threads.

3. The method of claim 1, wherein said inserting step comprises determining if a program instruction within said instruction stream has an associated auxiliary instruction within said set of auxiliary instructions.

4. The method of claim 3, each of said program instructions having an associated instruction address, wherein:

each auxiliary instruction has at least a portion of an instruction address associated therewith; and said determining step comprises the step of determining if said at least a portion of an instruction address of an auxillary instruction within said set corresponds to said instruction address of said program instruction.

5. The method of claim 3, wherein said determining step is performed previous to execution of said program instruction.

6. The method of claim 1, said processor having a local memory, wherein said method further comprises loading said set of auxiliary instructions into said local memory.

7. The method of claim 1, said processor comprising a multiscalar processor including a plurality of processing elements wherein said method further comprises speculatively assigning threads among said plurality of threads to selected ones of said plurality of processing elements for execution.

8. The method of claim 7, wherein said step of supplying a program comprises the step of supplying threads that are executable by a scalar processor.

9. The method of claim 7, said method further comprising:

in response to execution of said auxiliary instruction, synchronizing execution of two of said plurality of threads.

10. The method of claim 3, wherein at least one of said plurality of program instructions is associated with multiple auxiliary instructions.

11. A processor, comprising:

a first portion of memory, wherein said first portion of memory stores a program comprising a plurality of threads and a plurality of thread descriptors that are each associated with a respective one of said plurality of threads, wherein each thread includes a plurality of program instructions;

a second portion of memory, wherein said second portion of memory stores at least one set of auxiliary instructions, wherein each of said at least one set of auxiliary instructions is identified in the thread descriptor of one of said plurality of threads;

an execution core;

means for supplying one or more threads to said execution core for processing; and means, responsive to said execution core processing a thread within said program for which the associated thread descriptor identifies a set of auxiliary instructions, for automatically inserting at least one auxiliary instruction from said set of auxiliary instructions into the execution core's instruction stream at a position in the instruction stream indicated by the associated thread descriptor such that said at least one auxiliary instruction is subsequently executed within said execution core.

12. The processor of claim 11, wherein said means for inserting comprises a content-addressable memory (CAM) that stores each auxiliary instruction within said set together with at least a portion of an instruction address of an associated program instruction.

13. The processor of claim 11, said processor further comprising means for loading said set of auxiliary instructions from said second portion of memory into said CAM in response to and associated thread being assigned to said execution core.

14. The processor of claim 11, said processor further comprising:

a plurality of processing elements, wherein said execution core forms a portion of one of said processing elements; and a thread scheduler that speculatively assigns threads among said plurality of threads to selected ones of said plurality of processing elements for execution.

15. The processor of claim 14, wherein said plurality of threads are executable by a scalar processor.

16. The processor of claim 14, wherein at least one of said auxiliary instructions synchronizes execution of two of said plurality of threads.

* * * * *

UNITED STATES PATENT AND TRADEMARK OFFICE
CERTIFICATE OF CORRECTION

PATENT NO. : 5,961,639  
DATED : October 5, 1999  
INVENTOR(S) : Soummya Mallick et al.

Page 1 of 1

It is certified that error appears in the above-identified patent and that said Letters Patent is hereby corrected as shown below:

Column 5,  
Line 60, please change "multiscaiar" to -- multiscalar --.

Column 13,  
Line 35, please change "ail" to -- all --.

Column 15,  
Line 43, please change "then" to -- than --.

Column 22,  
Line 8, please change "820" to -- 620 --.

Column 25,  
Line 16, please change "On" to -- In --.  
Line 39, please delete "11".

Signed and Sealed this

Twenty-second Day of October, 2002

*Attest:*

JAMES E. ROGAN  
*Attesting Officer*  *Director of the United States Patent and Trademark Office*